(12) United States Patent
Nabuurs et al.

(10) Patent No.: US 10,336,853 B2
(45) Date of Patent: Jul. 2, 2019

(54) POLYMER, PROCESS AND COMPOSITION

(71) Applicant: DSM IP ASSETS B.V., Heerlen (NL)

(72) Inventors: Tijs Nabuurs, Echt (NL); Yvonne Wilhelmina Smak, Echt (NL); Gerardus Cornelis Overbeek, Echt (NL)

(73) Assignee: DSM IP ASSETS B.V., Heerlen (NL)

(*) Notice: Subject to any disclaimer, the term of this patent is extended or adjusted under 35 U.S.C. 154(b) by 36 days.

(21) Appl. No.: 15/813,028

(22) Filed: Nov. 14, 2017

(65) Prior Publication Data

US 2018/0072836 A1 Mar. 15, 2018

Related U.S. Application Data

(62) Division of application No. 14/376,067, filed as application No. PCT/EP2013/052170 on Feb. 4, 2013, now abandoned.

(30) Foreign Application Priority Data

| Feb. 3, 2012 | (EP) | 12153838 |
| Feb. 3, 2012 | (EP) | 12153839 |
| Feb. 3, 2012 | (EP) | 12153840 |
| Feb. 3, 2012 | (EP) | 12153842 |
| Jul. 10, 2012 | (EP) | 12175782 |
| Jul. 10, 2012 | (EP) | 12175784 |
| Jul. 10, 2012 | (EP) | 12175785 |
| Jul. 10, 2012 | (EP) | 12175786 |
| Jul. 10, 2012 | (EP) | 12175788 |

(51) Int. Cl.
*C08F 301/00* (2006.01)
*C08F 220/14* (2006.01)
(Continued)

(52) U.S. Cl.
CPC ......... *C08F 301/00* (2013.01); *B05D 3/0254* (2013.01); *B05D 3/06* (2013.01); *B05D 3/108* (2013.01); *C08F 8/32* (2013.01); *C08F 8/42* (2013.01); *C08F 8/44* (2013.01); *C08F 22/10* (2013.01); *C08F 22/38* (2013.01); *C08F 26/06* (2013.01); *C08F 26/08* (2013.01); *C08F 220/06* (2013.01); *C08F 220/14* (2013.01); *C08F 220/18* (2013.01); *C08F 222/04* (2013.01); *C08F 222/14* (2013.01); *C08F 293/005* (2013.01); *C08L 33/02* (2013.01); *C08L 33/10* (2013.01); *C08L 33/12* (2013.01); *C08L 35/02* (2013.01); *C08L 51/003* (2013.01); *C08L 67/08* (2013.01); *C08L 75/04* (2013.01); *C09D 125/14* (2013.01); *C09D 133/02* (2013.01); *C09D 133/08* (2013.01); *C09D 133/10* (2013.01); *C09D 133/12* (2013.01); *C09D 133/14* (2013.01); *C09D 135/02* (2013.01); *C09D 151/003* (2013.01); *C09D 153/00* (2013.01); *C09D 167/08* (2013.01);
(Continued)

(58) Field of Classification Search
CPC ........... C08F 2220/1825; C08F 222/04; C08F 220/14; C08F 8/32; C08F 8/42; C08F 8/44; C08F 220/06; C08F 220/18; C08F 222/14; C08F 22/10; C08F 22/38; C08F 2438/03; C08F 26/06; C08F 26/08; C08F 2800/20; C08F 2810/20; C08F 2810/50; C08F 293/005; C08F 301/00; B05D 3/0254; B05D 3/06; B05D 3/108; C08L 2201/52; C08L 33/02; C08L 33/10; C08L 33/12; C08L 35/02; C08L 51/003; C08L 67/08; C08L 75/00; C08L 75/04; C09D 125/14; C09D 133/02; C09D 133/08; C09D 133/10; C09D 133/12; C09D 133/14; C09D 135/02; C09D 151/003; C09D 153/00; C09D 167/08; C09D 175/04; C09D 175/08; Y02P 20/582; Y10T 428/31551; Y10T 428/31786; Y10T 428/31935; Y10T 428/31938
See application file for complete search history.

(56) References Cited

U.S. PATENT DOCUMENTS

| 2,684,355 A | 7/1954 | Van Horne et al. |
| 2007/0238824 A1 | 10/2007 | Smak |
| 2013/0065070 A1 | 3/2013 | Nabuurs |

FOREIGN PATENT DOCUMENTS

| CN | 101880490 | 11/2010 |
| WO | 2011/073417 | 6/2011 |

OTHER PUBLICATIONS

International Search Report for PCT/EP2013/052170, dated Apr. 8, 2013.
(Continued)

*Primary Examiner* — Frances Tischler
(74) *Attorney, Agent, or Firm* — Nixon & Vanderhye P.C.

(57) ABSTRACT

There is described a low number average molecular weight ($M_N$<10 kD) and high glass transition temperature (>75° C.) copolymer (optionally a solid grade oligomer (SGO)) that comprises (a) at least 20 wt-% of itaconate functional monomer(s), (b) not more than 40% of a hydrophilic monomer, preferably an acid functional monomer(s) in an amount sufficient to achieve an acid value from 65 to 325 mg KOH per g of solid polymer; (c) optionally not more than 70% of other monomers not being either (a) or (b), having a max content of vinyl aromatic monomer(s) of 40 wt-% and/or max content of methacrylate(s) of 40 wt-%; where the weight percentages of monomers (a), (b) and (c) are calculated as a proportion of the total amount of monomers in the copolymer being 100%.

6 Claims, No Drawings

(51) Int. Cl.

| | | |
|---|---|---|
| C08F 222/04 | (2006.01) | |
| C08F 222/14 | (2006.01) | |
| C08F 293/00 | (2006.01) | |
| C09D 153/00 | (2006.01) | |
| C08F 220/06 | (2006.01) | |
| C09D 133/02 | (2006.01) | |
| C09D 133/12 | (2006.01) | |
| C09D 135/02 | (2006.01) | |
| C08L 33/02 | (2006.01) | |
| C08L 33/12 | (2006.01) | |
| B05D 3/02 | (2006.01) | |
| B05D 3/06 | (2006.01) | |
| B05D 3/10 | (2006.01) | |
| C08F 22/10 | (2006.01) | |
| C08F 22/38 | (2006.01) | |
| C08F 26/06 | (2006.01) | |
| C09D 133/14 | (2006.01) | |
| C08L 33/10 | (2006.01) | |
| C08L 51/00 | (2006.01) | |
| C08L 67/08 | (2006.01) | |
| C08L 75/04 | (2006.01) | |
| C09D 133/10 | (2006.01) | |
| C09D 151/00 | (2006.01) | |
| C09D 167/08 | (2006.01) | |
| C09D 175/04 | (2006.01) | |
| C08L 35/02 | (2006.01) | |
| C08F 220/18 | (2006.01) | |
| C09D 133/08 | (2006.01) | |
| C09D 125/14 | (2006.01) | |
| C09D 175/08 | (2006.01) | |
| C08F 8/32 | (2006.01) | |
| C08F 8/42 | (2006.01) | |
| C08F 8/44 | (2006.01) | |
| C08F 26/08 | (2006.01) | |
| C08L 75/00 | (2006.01) | |

(52) U.S. Cl.
CPC .......... *C09D 175/04* (2013.01); *C09D 175/08* (2013.01); *C08F 2220/1825* (2013.01); *C08F 2438/03* (2013.01); *C08F 2800/20* (2013.01); *C08F 2810/20* (2013.01); *C08F 2810/50* (2013.01); *C08L 75/00* (2013.01); *C08L 2201/52* (2013.01); *Y02P 20/582* (2015.11); *Y10T 428/31551* (2015.04); *Y10T 428/31786* (2015.04); *Y10T 428/31935* (2015.04); *Y10T 428/31938* (2015.04)

(56) References Cited

OTHER PUBLICATIONS

Written Opinion of the International Searching Authority for PCT/EP2013/052170, dated Apr. 8, 2013.

POLYMER, PROCESS AND COMPOSITION

This application is a divisional of commonly owned U.S. application Ser. No. 14/376,067, filed Jul. 31, 2014 (now abandoned), which is the U.S. national phase of International Application No. PCT/EP2013/052170, filed Feb. 4, 2013, which designated the U.S. and claims priority EP Application No. 12153842.5, filed on Feb. 3, 2012; EP Application No. 12153840.9, filed on Feb. 3, 2012; EP Application No. 12153839.1, filed on Feb. 3, 2012; EP Application No. 12153838.3, filed on Feb. 3, 2012; EP Application No. 12175782.7, filed on Jul. 10, 2012; EP Application No. 12175784.3, filed on Jul. 10, 2012; EP Application No. 12175785.0, filed on Jul. 10, 2012; EP Application No. 12175786.8, filed on Jul. 10, 2012 and EP Application No. 12175788.4, filed on Jul. 10, 2012, the entire contents of each of which are hereby incorporated by reference.

This invention relates to polymers made from itaconate and similar monomers; to a process for making these polymers and to their use in coatings, inks and adhesives.

Itaconate esters, also known as 2 methylidenebutanedioate esters, are monomers that can be obtained from biorenewable sources. Yet despite been well known for many years, they have not been widely used to make commercial polymers because they often are expensive and difficult to process.

Polymers with a low molecular weight (low Mn) and a high glass transition temperature (high Tg) are desirable for several reasons. They can form useful coatings, may be used as stabilizers (e.g. in emulsion polymerization). They may produce films with improved hardness and blocking resistance. Examples of such low Mn, high Tg polymers are solid grade oligomers (also referred to as SGO).

The applicant has found that itaconate esters can be used to prepare improved polymers such as low Mw/high Tg solid grade oligomers. Surprisingly the various difficulties of using itaconate ester monomers can be overcome and they may be incorporated into polymers having some or all of the advantages described herein. Itaconate polymers of the invention may also form films at room temperature which are highly flexible (elastic) and are less prone to blocking.

As used herein the term solid grade oligomer (SGO) preferably denotes an oligomer composition comprising an oligomer (preferably the oligomer having a weight average molecular weight as measured by GPC of no more than 100,000 g/mol) the composition substantially comprising solid material (preferably solid in an amount greater than or equal to 95% by weight of oligomer composition, more preferably consists of solid material) under standard conditions. The terms "oligomer", "substantially comprises" and "standard conditions" are defined later in this document, Polymers prepared by bulk polymerisation of methacrylate monomers are generally poorly converted or require undesirable process conditions. In a further problem addressed by this invention the applicant has also found that these methacrylate monomers can be wholly or partially replaced by itaconate or similar monomers. This can reduce the concentration of initiators and/or lower the polymerisation temperatures required to produce polymers. The resultant polymers are prepared at a high conversion rate of monomer and have similar properties to those made from the methacrylate monomers.

The further optional problem is addressed by the invention. It has also been found that omitting styrene monomers results in several undesirable changes to the polymerization process especially when producing low molecular weight polymers. For example initiator concentration is increased, chain transfer agent (CTA) is used and/or polymerization temperature is increased. Vinyl aromatic monomers such as styrene are also undesirable for other reasons as they are possible carcinogens and have other potentially chronic adverse health effects. It would be preferable to use as little vinyl aromatic monomer as possible and preferably omit these monomers entirely. Styrene monomers have previously been replaced with methacrylate monomers (for example as described in EP156170). However as described above there are problems with using methacrylate monomers as a direct styrene replacement. The applicant has unexpectedly found that itaconate functional monomers can be used to replace vinyl aromatic monomers such as styrene (in whole or in part) to achieve similar properties to those imparted by such monomers in the resultant polymer. As used herein unless the context dictates otherwise 'styrene' (e.g. styrene-free) may also refer to any similar vinyl aromatic monomers.

Thus to summarise one aspect of the invention the applicant has now surprisingly found that itaconate ester monomers can be used to replace or reduce the amount of styrene and/or methacrylate (MA) monomers added to a polymer whilst addressing some or all of the consequent problems with low-styrene, low-MA, styrene-free and/or MA-free polymers. Thus (in one aspect of the invention) low $M_w$/high Tg polymers can be prepared with low water sensitivity at a much reduced (or even zero) styrene and/or MA content at a reasonable monomer conversion using lower amounts of chain transfer agent (CTA), lower initiator concentrations and/or lower temperatures then before.

For example one preferred object of the present invention is to provide polymers having a number average molecular weight of less than 15 kg/mole and Tg greater than 75° C. that are substantially free of vinyl aromatic monomers. Such polymers may be prepared using no more than 1 weight part (per 100 monomer) of CTA, less than 1 mole parts (per 100 monomer) of initiator and/or from a polymerisation at a temperature of no more than 275° C.

Further problems that may also be addressed by the present invention are described herein and it is an object of the present invention to solve some or all of the problems identified herein.

Some of the prior art documents are discussed below.

WO82/02387 (SCJ) describes a bulk polymerization process for preparing low molecular weight vinyl polymers having a dispersion index less than 2 and a number average molecular weight from 1000 to 6000. The polymers are prepared by continuously charging a mixture of at least one mono alkenyl aromatic monomer and at least one acrylic monomer into a reactor containing a molten resin mixture of unreacted monomers and the vinyl polymers at a temperature from 235° C. to 310° C., whilst maintaining a flow rate so the residence time of the monomer in the reactor is 2 minutes and the reaction mix is kept at a predetermined level.

EP156170 (SCJ) describes a similar bulk polymerization process to that described above for preparing enhanced yields of high solids, low molecular weight acrylic polymers having a narrow molecular weight distribution and a low chromophore content. The process involves continuously charging mixture of a polymerization initiator and at least one acrylic monomer (in respective molar ratio of 0.0005:1 to 0.06:1) and a reaction solvent (in amount of 0 to 25% by weight % of the acrylic monomer) into a reactor containing a molten mixture of unreacted acrylic monomers and the acrylic polymer whilst maintaining a flow rate so the residence time of the monomer in the reactor is >=1 minute, the reaction mix is kept at a predetermined level and the molten resin mixture is keep at an elevated reaction temperature sufficient to provide accelerated conversion to a readily processable, uniform, concentrated polymer product.

EP554783 (BASF) describes a process for the continuous polymerization of vinyl monomers to form vinyl polymers by free radical initiated or thermally initiated polymerization within an annular gap reactor comprising an outer tube and a cylindrical rotor inserted therein so the annular gap is 0.5 to 10 mm wide, giving a residence period of from 1 to 10 minutes. The outer tube is temperature controlled so the polymerization is performed at 150 to 270° C. providing a vinyl polymer having a molecular weight Mn of from 1000 to 20,000 and a polydispersity (Mw/Mn)<3.5.

U.S. Pat. No. 6,346,590 describes a continuous polymerization and condensation process of continuously charging into a primary reactor a mixture of: at least one radically-polymerisable monomer with a radically polymerisable group and also a condensation reactive functionality (CRF); at least one modifying agent (not a monohydroxy alcohol) having a group that reacts with the CRF; where the temperature in the primary reactor is kept at a level to polymerize the monomer effectively and to allow at least a portion of the CRF to react with the modifying agent to produce a gel-free first polymer incorporating at least some of the modifying agent. The radically-polymerisable monomer is being added to primary reactor as the first polymer is being simultaneously removed. The first polymer is added to a secondary reactor maintained at an effective temperature to form a second polymer.

WO2005/097854 (DSM) describes an aqueous composition comprising: i) at least a cross-linkable vinyl oligomer A with a weight average molecular weight in the range of from 1000 to 80,000 g/mole obtained by bulk polymerisation of: (a) 5 to 45 wt % of vinyl monomers bearing ionic or potentially ionic water-dispersing groups; (b) 0 to 30 wt % of vinyl monomers bearing non-ionic water-dispersing groups; (c) 2 to 25 wt % of vinyl monomers bearing cross-linkable groups; (d) 0 to 40 wt % of a-methyl styrene; (e) 10 to 93 wt % of vinyl monomers not in (a), (b), (c) or (d); where (a)+(b)+(c)+(d)+(e)=100%; and ii) at least a vinyl polymer B with a weight average molecular weight>5000 g/mole, obtained by polymerisation in the presence of vinyl oligomer A of: (f) 0 to 5 wt % of vinyl monomers bearing ionic or potentially ionic water-dispersing groups; (g) 0 to 20 wt % of vinyl monomers bearing non-ionic water-dispersing groups; (h) 0 to 15 wt % of vinyl monomers bearing cross-linkable groups; (i) 60 to 100 wt % of vinyl monomers not in (f), (g) or (h); where (f)+(g)+(h)+(i)=100%; where the ratio of vinyl oligomer A to vinyl polymer B is in the range of from 5: 95 to 95:5; where polymer B is more hydrophobic than vinyl oligomer A; where the weight average molecular weight of vinyl polymer B is more than the weight average molecular weight of vinyl oligomer A; iii) 0 to 20 wt % of co-solvent; and iv) 30 to 90 wt % of water; where i)+ii)+iii)+iv)=100%.

Further prior art documents describe the use of itaconate esters in general terms.

U.S. Pat. No. 4,206,292 (Kureha Kagaku Kogyo Kabushiki Kaisha) describes a vinyl chloride resin composition having surface smoothness comprises: (1) 100 parts of vinyl chloride polymer; and (2) 0.1 to 30 parts of a polymer processing aid comprising: (A) 10 to 100 parts of a copolymer comprising 20 to 99% of an alkyl methacrylate, 1 to 70% of a dialkyl itaconate, and 0 to 60% of a copolymerisable monomer; and (B) 0 to 90 parts of a copolymer comprising 80 to 100% of an alkyl methacrylate, and 0 to 20% of a copolymerisable monomer. This vinyl chloride resin composition is not very relevant for coating compositions to be prepared from bio-based or other environmentally benign sources.

U.S. Pat. No. 4,547,428 (Monsanto) describes a terpolymer comprising repeating units derived from an olefin, a diester of an addition polymerisable unsaturated dicarboxylic acid, and a solubilizing monomer which promotes compatibility between the terpolymer and a vinyl halide polymer. A granular form of the processing aid and a method for its preparation are also disclosed. These polymers are not suitable for coating applications.

U.S. Pat. No. 4,588,776 (Monsanto) describes a polymer composition comprising a blend of a vinyl halide polymer and a particulate terpolymer having a molecular weight of at least 100,000 and a glass transition temperature of at least 50° C. The terpolymer comprises repeating units derived from an olefin, a diester of an addition polymerisable unsaturated dicarboxylic acid, and a solubilizing monomer which promotes compatibility of the terpolymer with the vinyl halide polymer. These polymers are used to prepare shaped plastic articles and not for coating applications.

U.S. Pat. No. 6,951,909 (3M) describes a polymerisable system comprises an organoborane, at least one polymerisable monomer, and a work-life extending agent.

WO11/073417 (DSM) discloses an aqueous emulsion comprising at least a vinyl polymer, said vinyl polymer comprising: a) 45 to 99 wt-% of itaconate ester monomers having formula (I), wherein R and R' are independently an alkyl or an aryl group; b) 0.1 to 15 wt-% of ionic or potentially ionic unsaturated monomers; c) 0 to 54 wt-% of unsaturated monomers, different from a) and b); and 0.9 to 54.9 wt-% by weight of total monomers of a chaser monomer composition added subsequently and polymerised after the polymerisation of monomers a), b) and c); wherein a)+b)+c) and the chaser monomer composition add up to 100 wt-%; and wherein the aqueous emulsion contains less than 0.5 wt-% free itaconate ester monomers of formula I based on the total weight of the aqueous emulsion. Although it is a stated object of the invention to provide a vinyl polymer with a high total concentration of itaconate ester monomers (see page 2, lines 14 to 17) in practise the larger proportion of such itaconate esters are lower itaconate esters (i.e. esters of small alkyl groups such as DMI). This document does not teach that it would be desirable to use a high concentration of higher itaconate esters (i.e. esters of large alkyl groups such as DBI). Indeed '417 states that itaonate esters are difficult to process (see page 2, lines 23 to 25) which combined with the teaching of the examples demotivates a reader to incorporated large amounts of hydrophobic higher itaconate esters like DBI in a copolymer. The only examples in '417 that describe use of a DBI monomer are Examples 2, 4, 5 and 6. It can be seen that DBI is used as co-monomer only at a low concentrations in the final copolymer prepared in these Examples (at a maximum of 22.7 wt-%) which are each also prepared with significant amounts of another hydrophobic monomer butyl acrylate (BA). A styrene chaser monomer is always present in the final product (at least 1.5 wt-%). These examples teach away from using DBI or other higher itaconate esters to replace common hydrophobic monomers such as BA, EHA and/or styrene. No significant improvement is seen in film properties such as hardness and water sensitivity of the copolymers prepared in this document.

GB1009486 (Borden) describes a latex of composite polymeric particles where the core and shell may comprise a copolymer of a vinylidene chloride and an ester of an alpha unsaturated aliphatic acid (the amount of ester in the shell being greater than the core). One example (Example 3) describes use of dibutyl itaconate (DBI) as the ester in an total amount of 17% by weight of total monomers (5% in the outer shell and 12% in an inner non-core layer). These composite multi-layer polymer particles address a problem of providing a water vapour barrier coating for paper and the like and they use much lower amounts of DBI than the present invention.

U.S. Pat. No. 3,766,112 describes a high gloss latex for floor polish comprising a chlorinated paraffin wax with a polyvinyl pyrolidone protective colloid. Four monomer components used to prepare the colloid: styrene (70 to 85%), 2-ethylhexyl acrylate (EHA) (5 to 15%) (meth)acrylic acid (3 to 10%) and a fourth monomer (1 to 5%) all percentages by weight of total monomers of the polyvinyl pyrolidone. One of the seven monomers suggested as the fourth monomer is DBI. These polymers address the problem of providing high gloss floor coatings and DBI is used in much lower amounts than in the present invention.

Therefore broadly in accordance with the present invention there is provided a copolymer having a low molecular weight (Low MW) and high glass transition temperature (High TG) the copolymer comprising (preferably consisting essentially of) moieties obtained and/or obtainable from the following components:
- (a) at least 20 wt-% of one or more itaconate functional monomer(s) not containing acidic groups or precursor acid groups (also referred to herein as 'Itaconate Monomer'),
- (b) not more than 40 wt-% of an acid functional monomer(s) in an amount sufficient to achieve an acid value from 65 to 325 mg KOH per g of solid polymer (also referred to herein as 'Acidic Monomer')
- (c) optionally not more than 72 wt-% of other monomers not being either (a) or (b) (also referred to herein as 'Other Monomer');
- where the weight percentages of monomers (a), (b) and (c) total 100% and are calculated as a proportion of the total amount of monomers in the copolymer being 100%; and with the provisos:
- (I) the copolymer has a number average molecular weight ($M_n$) of no more than 15 kilograms/mole (also referred to herein as 'Low MW'); and
- (II) the copolymer has a glass transition temperature of at least 75° C. (also referred to herein as 'High TG'),
- and where optionally either or both of provisos (III) and/or (IV) apply:
- (III) the copolymer contains less than 40 wt-% vinyl aromatic monomer(s) (also referred to herein as 'Low Vinyl Aromatic' or Low-Styrene'); and/or
- (IV) the copolymer contains less than 40 wt-% methacrylate monomer(s) (also referred to herein as 'Low-MA').

Optionally the copolymers of the invention are solid grade oligomers (SGO).

It is preferred that polymers of the invention, and/or the itaconate monomers are obtained from bio-renewable sources.

A further aspect of the present invention comprises a coating composition comprising from 5 to 80 wt-% of the total composition of a Low MW and High TG copolymer of the invention as described herein.

Copolymers of the invention may also be independently limited by one or more of the following optional provisos:

- (V) when component (a) consists of DBI in an amount of less than 30% by weight of the total monomers then the copolymer is substantially free of any chloro groups; and
- (VI) when component (a) consists of DBI in an amount of less than 23% by weight of the total monomers then the copolymer is prepared by other than an emulsion polymerisation method in which a chaser monomer is used; and
- (VII) when component (a) consists of DBI in an amount of less than 23% by weight of the total monomers then if component (d) is present, component (d) is other than styrene or a mixture consisting of butyl acrylate (60 wt-% of mixture) and styrene (40 wt-% of mixture)
- (VIII) the copolymer is substantially free of styrene (preferably styrene free), more preferably component (d) if present is other than styrene or a mixture consisting of butyl acrylate (60 wt-% of mixture) and styrene (40 wt-% of mixture), more preferably component (d) if present is other than styrene (S), butyl acrylate (BA), 2-ethyl hexyl; acrylate (EHA) or mixtures thereof.
- (IX) is prepared by other than an emulsion polymerisation method in which a chaser monomer is used; and
- (X) the copolymer is prepared by other than an emulsion polymerisation method in which a chaser monomer is used optionally this proviso applying only when component (a) consists of DBI preferably in an amount of from 8.5 to 15% by weight of the total monomers (a)+(b)+(c)+(d).
- (XI) when component (a) consists of DBI then component (a) is present in an amount other than 8.5 wt-%, 21.8 wt-%, 22.5 wt-% or 22.7 wt % of the total monomer composition, preferably other than from 8 wt-% to 23 wt %,
- (XII) when component (a) consists of DBI then component (a) is present in an amount other than 4.7 wt-%, 5.0 wt-%, 8.5 wt-%, 21.8 wt-%, 22.5 wt-%, 22.7 wt %, 25.0 wt-%, 28.7 wt-%, 30.0 wt-% or 41.2 wt-% of the total monomer composition, preferably other than from 4 wt-% to 42 wt %,
- (XIII) the copolymer is obtained other than from a polymerisation of a dimethyl itaconate (DMI) and dibutyl itaconate (DBI) in the respective weight ratio of 15 to 85 in the presence of poly diethyl itaconate seed polymer; more preferably the copolymer is obtained other than from polymerisation of dialkyl itaconate(s) in the presence of a poly diethyl itaconate seed polymer; most preferably the copolymer is obtained other than from polymerisation in the presence of a poly dialkyl itaconate seed polymer; and/or
- (XIV) if polymerisation of the copolymer occurs in the presence of an initator system comprising organoborane amine complex and an activator then component (a) is present in an amount greater than 20 wt-%, preferably at least 24 wt-% of total monomers (a)+(b)+(c)+(d).

As used herein the term seed polymer is as defined in US2011-144265 (e.g. see paragraph [007]) i.e. a polymer seed particle is dispersed in an aqueous medium such that the seed particle absorbs further added (co)monomer and the seed particle is present at a concentration to allow for control of particle size of that (co)monomer.

Provisos (I) Low MW

Copolymers of the invention preferably have a number average molecular weight ($M_n$) of no more than 15 kilograms/mole (defined herein as Low MW), conveniently less than 10 kilograms/mole. Preferred copolymers of the invention have a number average molecular weight from 500 to 10000 g/mole, more preferably from 500 to 7000 g/mole, most preferably from 500 to 5000 g/mole, for example from 700 to 3000 g/mole.

(II) High TG

Copolymers of the invention have a high glass transition temperature of at least 75° C. (defined herein as High TG) as calculated using the Fox equation. Preferred High TG copolymers of the invention have a glass transition temperature of at least 80° C., more preferably at least 85° C., most preferably at least 90° C. for example at least 100° C.

(III) Low Vinyl Aromatic

The copolymer according to the invention may contain less than 40 wt-% of vinyl aromatic monomer(s), more preferably less than 20 wt-%, most preferably less than 10 wt-%, and even most preferably less than 5 wt-%, for example is substantially free of, (such as 0 wt-%) of vinyl aromatic monomer(s) by weight of the total monomers being 100%. The limits to what is meant herein by 'substantially free' are also as defined later It is optionally desired to limit the amount of vinyl aromatic monomer in the compositions and copolymers of the invention as their presence may result in yellowing, reduced outdoor durability, and may have potential adverse environmental and/or health impacts.

It is preferably desirable that copolymers and compositions of the invention comprise low amounts of vinyl aromatic monomer(s) such as styrene and/or other arylalkylene monomer(s). As used herein the term vinyl aromatic monomer(s) denotes monomers such as styrene, alpha-methyl styrene, vinyl toluene, vinyl anthracene, p-methyl styrene, and chloromethyl styrene. The term arylalkylene is also defined below. It is more preferred that monomers such as styrene and α-methyl styrene are present in low amounts (or absent) from compositions of the invention. Most preferred compositions of the invention are those that are substantially free of vinyl aromatics. If a vinyl aromatic monomer is used in the invention, is conventionally styrene.

However as described in the section on acidic monomers by using low molecular weight polymers of high AV it can be possible to use higher amounts of vinyl aromatic monomers (up to 40% by weight of monomers). Nevertheless in a convenient embodiment of the invention the copolymers comprise only a small amount of vinyl aromatic monomers (<20% by weight of monomers) and conveniently copolymers of the invention are substantially free of any vinyl aromatic monomers.

Surprisingly the applicant has discovered that embodiments of the invention in which the copolymer contains none or low amounts of vinyl aromatic monomers, the copolymer may be also be prepared by an improved polymerisation process that exhibits preferably at least one, more preferably two, most preferably three of the following features (I) to (III):

(I) uses no more than 1 weight parts, preferably no more than 0.5, more preferably no more than 0.2, even more preferably no more than 0.1 parts by weight, most preferably no chain transfer agent; relative to the total monomer composition (i.e. (a)+(b)+(c)) being 100 parts by weight (also denoted herein as wt parts per 100 monomer)

(II) uses no more than 1 mole parts of initiator, preferably no more than 0.5, more preferably no more than 0.2, even more preferably no more than 0.1 parts by mole relative to the total monomer composition (i.e. (a)+(b)+(c)) being 100 mole parts; (also denoted herein as mole parts per 100 monomer) and/or (III) has a maximum polymerisation temperature of no more than 275° C., preferably no more than 225° C., more preferably no more than 200° C.

(IV) Low Methacrylate (Low-MA)

The copolymer according to the invention may contain less than 40 wt-% of methacrylate monomer(s), more preferably less than 20 wt-%, most preferably less than 10 wt-%, and even most preferably less than 5 wt-%, for example is substantially free of, such as 0 wt-% of MA monomer(s) by weight of the total monomers being 100%. The limits to what is meant herein by 'substantially free' are also as defined later. It is desired to limit the amount of MA monomer in the compositions and copolymers of the invention for the reasons already given.

(III) and (IV) Low-Styrene and Low-MA

The copolymers and compositions of the invention may also comprise low amounts of both vinyl aromatic monomer(s) and MA, usefully the total amount of vinyl aromatic monomer(s) and MA monomer(s) is less than 40 wt-%, more usefully less than 20 wt-%, most usefully less than 10 wt-%, and even most usefully less than 5 wt-%, for example is substantially free of (such as 0 wt-%) of such monomer(s) by weight of the total monomers being 100%. The limits to what is meant herein by 'substantially free' are also as defined later.

Component Monomers

Components (a), (b) and (c) are mutually exclusive. Thus it will be appreciated that acid functional monomers that may also be derived from itaconates, such as itaconic acid, itaconic anhydride, half itaconate esters, acid derivatives thereof, combinations and/or mixtures thereof are considered part of the acid component (b) and are not part of the itaconate functional component (a)

In one preferred embodiment of the invention components (a) and (b) are each derived from itaconates and/or derivatives thereof, more preferably from a biorenewable source. Thus for example component (a) may be a di($C_{1-6}$dialkyl) itaconate, (e.g. DBI and/or DMI) and component (b) may be itaconic anhydride and/or $C_{1-4}$alkyl monoester thereof (e.g. itaconic acid). In such an embodiment optionally there is no component (c) so the copolymer may advantageously be obtained from monomers from the same itaconate source.

Component (a) ITACONATE MONOMER

Itaconate functional monomers that are suitable for use as component (a) in the present invention may be represented generally by Formula 1:

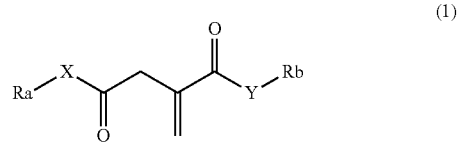

(1)

where Ra and Rb independently represent any optionally substituted hydrocarbo moiety (such as any aliphatic, cycloaliphatic or aromatic moieties); and X and Y independently represent —O— and/or —NRc-, where Rc independently in each case represents H and/or any optionally substituted hydrocarbo moiety (such as any aliphatic, cycloaliphatic or aromatic moieties);

with the proviso that Formula 1 does not contain:

any acidic groups (such as carboxylic, phosphoric and/or sulphonic acid groups) or any precursor acid groups, that is a group which readily generates an acid group under the conditions of polymerisation herein (such as an anhydride group).

When X and Y are both O, Formula 1 represents 2-methylidenebutanedioate diesters (also referred to herein as itaconate diesters). X and Y are both NRc, Formula 1 represents itaconate diamides.

When one or X or Y is O and the other is NRc Formula 1 represents a compound having one ester and one amide group.

It will be appreciated that the term itaconate functional monomer(s) as used herein denotes any itaconate diester and/or diamide monomers of Formula 1 (as defined herein), other itaconate esters, itaconate amides, Preferred itaconate functional monomers are those of Formula 1 where Ra and Rb independently represent: optionally substituted $C_{1-30}$hydrocarbyl, more preferably $C_{1-20}$alkylene (which may comprise linear, branched and/or cyclic moieties) and/or $C_{3-20}$arylene; most preferably $C_{1-10}$alkylene.

Whilst Ra and Rb may be different, more conveniently they represent identical moieties.

Conveniently Formula 1 may represent dialkyl or aryl esters of itaconic acid, dialkyl or aryl amides of itaconic acid. More conveniently Ra and Rb may be independently selected from the group consisting of: methyl, ethyl, n-propyl, i-propyl, n-butyl, i-butyl, t-butyl, hexyl, cyclohexyl, 2-ethylhexyl, decyl, dodecyl, phenyl, 2-phenylethyl, 2-hydroxyethyl, 2-hydroxypropyl, 3-hydroxypropyl, and 4-hydroxybutyl. More conveniently Ra and Rd are selected from: methyl, ethyl, n-butyl and 2-ethylhexyl. Most conveniently Ra and Rb are selected from methyl and ethyl for example methyl.

The itaconate functional component (a) is present in the compositions and/or copolymers of the invention in an amount of at least 20 wt-%, usefully at least 25 wt-%, more usefully at least 30 wt-%, even more usefully at least 35 wt-% and most usefully at least 40 wt-%, based on the total weight of monomers (a), (b) and (c) used to prepare the copolymer being 100%.

Conveniently the itaconate functional component (a) may be present in the compositions and/or copolymers of the invention in an amount of less than 80 wt-%, more conveniently less than 75 wt-%, even more conveniently less than 70 wt-%, most conveniently less than 65 wt-%, and for example less than 60 wt-%; based on the total weight of monomers (a), (b) and (c) used to prepare the copolymer being 100%.

Preferably the itaconate functional component (a) may be present in the compositions and/or copolymers of the invention in an amount of from 20 to 80 wt-%, more preferably from 25 to 75 wt-%, even more preferably from 30 to 70 wt-%, most preferably from 35 to 65 wt-%, for example from 40 to 60 wt-% based on the total weight of monomers (a), (b) and (c) used to prepare the copolymer being 100%.

Itaconate functional monomers such as those represented by Formula 1 may also be broadly divided into two types higher itaconate esters which are generally hydrophobic and lower itaconate esters which are generally hydrophilic In one embodiment of the invention the itaconate functional monomer may be an itaconate diester of Formula 1 where Ra and Rb are independently optionally substituted $C_{1-3}$hydrocarbo groups, such as $C_{1-3}$alkyl, an example of which is dimethyl itaconate (DMI).

In another embodiment of the invention the itaconate functional monomer may be an itaconate diester of Formula 1 where Ra and Rb are independently optionally substituted $C_{4-8}$hydrocarbo groups, such as $C_{4-6}$alkyl, an example of which is dibutyl itaconate (DBI).

The itaconate functional monomers (a) may be selected from those itaconate monomers that form homopolymers having a Tg of preferably more than 40° C., more preferred more than 60° C., and most preferred more than 80° C.

Component (b) ACIDIC MONOMER (Also Referred to as 'Acidic Component')

It will be understood that when referring to acid functional and/or acidic components herein refers to both acidic moieties (such as carboxylic, phosphoric and/or sulphonic acid groups) and/or precursor acidic moieties which under the conditions of use may form acidic groups (e.g. anhydrides). An acid bearing monomer could be polymerised as the free acid or as a salt, e.g. the ammonium and/or alkali metal salt thereof. References herein to acids should therefore also be understood to include suitable salts and/or derivatives thereof (such as anhydrides and/or acid chlorides thereof).

Thus copolymers of the invention comprise acidic functional monomers (component (b)) that comprise an acid group and/or a precursor acid group.

Suitable acid monomers can be monofunctional or difunctional in potential acid functionality. Preferred monomers are acrylic acid, methacrylic acid, β-carboxyethyl acrylate, itaconic acid, itaconic anhydride, maleic acid, and maleic anhydride.

Other preferred acids have one ethylenic group and one or two carboxy groups. Such acid monomers are selected from the group consisting of: acrylic acid (and copolymerisable oligomers thereof), citraconic acid, mesaconic acid, crotonic acid, fumaric acid, itaconic acid, maleic acid, methacrylic acid, methylene malonic acid, anhydrides thereof, salts thereof, acid chlorides thereof, phosphated hydroxyl ethyl methacrylate (phosphated HEMA), phosphated hydroxyl ethyl acrylate (phosphated HEA), phosphated hydroxyl propyl methacrylate (phosphated HPMA), phosphated hydroxyl propyl acrylate (phosphated HPA), sulphonated styrene (and its chloride), 2-acrylamido-2-methylpropane sulfonic acid (AMPS) and ethylmethacrylate-2-sulphonic acid, partial acids of multivalent esters, more preferably. half esters of diesters, most preferably mono acid half itaconate esters (i.e. those esters of Formula A where either $R_a$ or $R_b$ is H). combinations thereof in the same species and/or mixtures thereof.

More preferred monomers are acrylic acid, methacrylic acid, β-carboxyethyl acrylate, and itaconic anhydride. The most preferred acid functional monomer is itaconic anhydride.

Suitable acid functional monomers of Component (b) are those that are co-polymerisable with the itaconate functional monomer(s) of component (a). Conveniently at least one monomer of component (b) may comprise at least one activated unsaturated moiety as defined herein.

Usefully the monomer of component (b) is an acid functional ethylenically unsaturated monomer for example an acid functional (meth)acrylic monomer.

Preferred acidic monomers comprise, advantageously consist essentially of, at least one ethylenically unsaturated carboxylic acid although other acid groups such as optionally substituted organo phosphoric and/or sulphonic acids may also be used.

Examples include phosphated alkyl (meth)acrylates, sulphonic acids (and derivatives thereof) of arylalkylenes, sulphonic acids (and derivatives thereof) of alkyl (meth) acrylates and/or other organo substituted sulphonic acids (such as acrylamidoalkyl sulfonic acids).

Useful arylalkylene sulphonic acids are those where the arylalkylene moiety comprises optionally hydrocarbo substituted styrene, conveniently optionally $C_{1-10}$hydrocarbyl substituted styrene more conveniently optionally $C_{1-4}$alkyl substituted styrene. Useful acids are sulphonic acid substituted derivatives of styrenic compounds selected from the group consisting of styrene, α-methyl styrene, vinyl toluene, t-butyl styrene, di-methyl styrene and/or mixtures thereof. Especially preferred is styrene p-sulphonic acid and its corresponding acid chloride styrene p-sulphonyl chloride. However it is a preferred object of the invention to reduce (in one embodiment preferably eliminate) the amount of vinyl aromatic moieties (such as styrene and the like) in the copolymers of the invention. Therefore arylalkylene sulphonic acids are not preferred for use as the acidic monomer (b) or if present are in such amounts to satisfy proviso (III) that the copolymer of the invention comprises less than 40% of vinyl aromatic monomer.

Preferred phosphated organo acids comprise phosphated (meth) acrylates optionally substituted for example with one or more hydroxyl groups, for example phosphated hydroxy (meth)acrylates and $C_{1-4}$alkyl esters thereof.

Particularly preferred acid monomers are acrylic acid, methacrylic acid, beta carboxy ethyl acrylate, itaconic acid, and/or itaconic anhydride.

It is known that certain acidic components which may or may not themselves polymerise directly to form copolymers of the invention may also act as precursors for other monomers that undergo polymerisation to form a copolymer of the invention. For example at sufficiently high temperatures in one embodiment of the invention itaconic acid will dehydrate to form itaconic anhydride in situ which may be then react as a monomer in a copolymerisation to form a copolymer of the invention.

For emulsion polymerization acidic monomers such as acrylic acid, methacrylic acid, beta carboxy ethyl acrylate, and/or itaconic acid may be convenient. For a Solvent Assisted Dispersion (SAD) copolymerization acidic monomers such as acrylic acid, methacrylic acid, and/or itaconic anhydride are preferred.

Usefully the acidic component (b) may be present in the compositions and/or copolymers of the invention in an amount of at least 10 wt-%, more usefully at least 15 wt-%, even more usefully at least 20 wt-%, most usefully at least 25 wt-%, based on the total weight of monomers (a), (b) and (c) used to prepare the copolymer being 100%.

The Acidic Monomer (b) is present in the compositions and/or copolymers of the invention in an amount not more than 40 wt-%, conveniently less than 35 wt-%, more conveniently less than 30 wt-%; based on the total weight of monomers (a), (b) and (c) used to prepare the copolymer being 100%.

Preferably (and subject to the caveats relating to AV values below) the acidic component (b) may be present in the compositions and/or copolymers of the invention in an amount of from 10 to 40 wt-%, more preferably from 15 to 40 wt-%, even more preferably from 20 to 40 wt-%, most preferably from 25 to 40 wt-%, for example from 25 to 35 wt-% based on the total weight of monomers (a), (b) and (c) used to prepare the copolymer being 100%.

Usefully the acid monomer (b) may be present in the compositions and/or copolymers of the invention in an amount sufficient amount to achieve an acid value (AV) of at least 80 mg KOH/g, more usefully at least 120 mg KOH/g, most usefully at least 160 mg KOH/g, for example at least 195 mg KOH/g of solid polymer Conveniently the acid monomer (b) may be present in the compositions and/or copolymers of the invention in an amount sufficient amount to achieve AV of no more than 325 mg KOH/g, more conveniently no more than 290 mg KOH/g, most conveniently no more than 260 mg KOH/g, for example no more than 200 mg KOH/g of solid polymer.

Preferably the acid monomer (b) may be present in the compositions and/or copolymers of the invention in an amount sufficient amount to achieve AV from 65 to 325 mg KOH/g. of solid polymer.

It is an optional object of the invention to limit the amount of vinyl aromatic monomer as far as possible for the various reasons described herein. However the applicant has surprisingly discovered that the processing difficulties with use of higher amounts (up to 40% by weight) of vinyl aromatic monomer can be compensated to some extent by increasing AV number. Therefore in various alternative embodiments of the present invention the acid monomer may be present in the compositions and/or copolymers of the invention in various amounts sufficient to achieve certain acid values (in KOH/g per g of solid polymer) when the copolymer contains certain corresponding total amounts of vinyl aromatic monomer (in % by weight of total monomers of the copolymer):

Acid Value (AV) Vinyl Aromatic Monomer
from 200 to 325 mg KOH/g with from 30 up to 40 weight %; or
from 160 to 290 mg KOH/g with, from 20 up to 30 weight %; or
from 120 to 260 mg KOH/g with from 10 up to 20 weight %; or
from 80 to 195 mg KOH/g with from 0 up to 10 weight %.

Usefully component (b) satisfies both the acid value (AV) and weight limits herein, but it will be appreciated that depending on the monomer used the AV specified herein may be achieved using weight percentages outside those preferred wt-% values given herein. Where there is an apparent inconsistency herein between any weight % of monomer or other component and the acid values specified it will be appreciated that satisfying the AV is generally the more desirable objective. If necessary the values for weight % of the relevant ingredients can be modified appropriately in a manner well known to a skilled person.

The acidic functional monomers (b) may be selected from those acidic monomers (or precursors therefore) that form homopolymers having a Tg of preferably more than 40° C., more preferred more than 60° C., and most preferred more than 80° C.

Component (c)—Other Monomers

The copolymers of the invention comprise no more than 72 wt-%, preferably no more than 70 wt-%, preferably no more than 60 wt-%, more preferably no more than 40 wt-% of other monomers (component (c)) that are neither itaconate functional monomers (a) nor acid functional monomers (b). Component (c) may also satisfy proviso (III) and/or (IV) that the copolymer of the invention comprises less than 40% of vinyl aromatic monomer and/or less than 40% of methacrylate monomers. Therefore monomers such as arylalkylene and/or methacrylate monomers described herein are preferred as component (c) only to the limited extent described herein and optionally are substantially absent from the compositions of the invention.

Conveniently the other monomers of component (c) may be present in the compositions and/or copolymers of the invention in an amount of less than 30 wt-%, more conveniently less than 20 wt-%, even more conveniently less than 10 wt-% and most conveniently less than 5 wt-%, based on the total weight of monomers (a), (b) and (c) used to prepare the copolymer being 100%.

Usefully where present the other monomers of component (c) are present in the compositions and/or copolymers of the invention in an amount of at least 0.1 wt-%, more usefully at least 0.5 wt-%, even more usefully at least 5 wt-%, based on the total weight of monomers (a), (b) and (c) used to prepare the copolymer being 100%.

Preferably the other monomers of component (c) may be present in the compositions and/or copolymers of the invention in an amount of from 0.1 to 40 wt-%, more preferably from 0.5 to 40 wt-%—even more preferably from 5 to 40 wt-%, most preferably from 5 to 30 wt-%, for example from 5 to 20 wt-% based on the total weight of monomers (a), (b) and (c) used to prepare the copolymer being 100%.

Suitable non-itaconate functional non acid functional monomers are given below. Preferably component (c) comprises low amounts of (more preferably is other than) vinyl aromatic monomers and/or arylalkylene monomers.

The non-itaconate functional monomers can comprise any acrylic or methacrylic acid ester or amide having a homopolymer Tg of preferably more than 40° C., more preferred more than 60° C., and most preferred more than 80° C.

Preferred examples of such monomers are methyl methacrylate, ethyl methacrylate, diacetone acrylamide, acrylonitrile, hydroxyethyl methacrylate, cyclohexyl methacrylate, isobornyl (meth)acrylate, polyethylene (meth)acrylate, polypropylene (meth)acrylate, acryl amide and methacryl amide. Specifically preferred crosslinking monomers that can be used to prepare the low molecular weight copolymer of the invention are described in WO2005/097854 (DSM).

Component (c) comprises monomers not part of components (a), or (b)) that are copolymerisable with them in any suitable technique such as any of those described herein (for example in a SAD, solution, bulk, and/or an emulsion polymerisation).

Component (c) may comprise a suitable activated unsaturated moiety (such as ethylenic unsaturation) where the structure(s) of component (c) do not overlap with any of components (a) or (b)).

Preferably component (c) is used in an amount of less than 50% and more preferably less than 40% by weight.

Component (c) may comprise monomers that can undergo crosslinking, that can improve adhesion of the coating to various substrates, that can enhance the colloidal stability of the polymer emulsion, or that can be used to affect Tg, or polymer polarity.

Component (c) may also comprise crosslinking monomers that can induce crosslinking of the copolymer composition. Crosslinking can occur at ambient temperatures (using for instance diacetone acryl amide combined with adipic dihydrazide), at elevated temperatures (stoving conditions in which for instance copolymerized hydroxyethyl (meth)acrylate reacts with hexamethoxy methyl melamines), or as 2C composition (copolymerized hydroxyethyl (meth)acrylate reacting with polyisocyanates, such as Bayhydur 3100). Other examples of crosslinking monomers include hydroxypropyl (meth)acrylate, silane functional monomers, such as 3-methacryloxypropyl trimethoxysilane (Geniosil GF31, ex Wacker). When the intention is to use the coating composition as a UV coating the aqueous composition comprising the low molecular weight polymer according to the invention, may be admixed with polymers or oligomers having multiple unsaturated groups are admixed. Typical examples include di- or tri-functional multifunctional acrylates such as trimethylol propane triacrylate or ethoxylated or propoxylated versions thereof).

Preferably, the crosslinking monomer(s) is used in concentrations of less than 15 wt-%, more preferably less than 10 wt-%, and most preferably between 0 and 10 wt-%.

Component (c) may also comprise monomers that improve (wet) adhesion properties. Typical monomers include ureido functional monomers, such as Plex 6852-O (ex. Evonik), i-bornyl (meth)acrylate, polyethylene (meth)acrylate, polypropylene (meth)acrylate.

Preferably, the adhesion promoting monomer(s) is used in concentrations of less than 15 wt-%, more preferably less than 10 wt-%, and most preferably between 0 and 10 wt-%.

Optionally component (c) may also comprise least one polymer precursor(s) of Formula 3

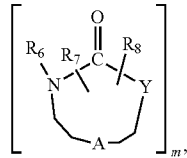

Formula 3 where Y denotes an electronegative group,
$R_6$ is H, OH or an optionally hydroxy substituted $C_{1-10}$hydrcarbo
$R_7$ is H or a $C_{1-10}$hydrocarbo;
$R_8$ is a $C_{1-10}$hydrocarbo group substituted by at least one activated unsaturated moiety; and; either:
A represents a divalent organo moiety attached to both the —HN— and —Y— moieties so the -A-, —NH—, —C(=O)— and —Y— moieties together represent a ring of 4 to 8 ring atoms, and $R_7$ and $R_8$ are attached to any suitable point on the ring; or
A is not present (and Formula 3 represents a linear and/or branched moiety that does not comprise a heterocyclic ring) in which case $R_7$ and $R_8$ are attached to $R_6$; and m is an integer from 1 to 4.

The ring moiet(ies) of Formula 3 are each attached to $R_8$ and in Formula 3 when m is 2, 3 or 4 then $R_8$ is multi-valent (depending on the value of m). If m is not 1 $R_7$ and —Y— may respectively denote the same or different moieties in each ring, preferably the same respective moieties in each ring. $R_7$ and $R_8$ may be attached at any suitable position on the ring.

Preferred monomers of Formula 3 comprise, conveniently consist essentially of, those where: A represents an optional substituted divalent $C_{1-5}$hydrocarbylene; and
—Y— is divalent —$NR_9$— (where $R_9$ is H, OH, optionally hydroxy substituted
$C_{1-10}$hydrocarbo or $R_8$) or divalent O,
More preferred monomers of Formula 3 comprise those where: m is 1 or 2
—Y— is —$NR_8$— (i.e. where Formula 2 is attached to $R_8$via a ring nitrogen), A represents a divalent $C_{1-3}$hydrocarbylene; $R_6$ is H, $R_7$ is a $C_{1-10}$hydrocarbo; and $R_8$ comprises a (meth)acryloxyhydrocarbo group or derivative thereof (e.g. maleic anhydride).

Monomers represented by Formula 3 include some monomers informally referred to as ureido monomers. Further suitable ureido monomers of Formula 3 are described in "Novel wet adhesion monomers for use in latex paints" Singh et al, Progress in Organic Coatings, 34 (1998), 214-

219, (see especially sections 2.2 & 2.3) and EP 0629672 (National Starch) both of which are hereby incorporated by reference. Conveniently the monomers of Formula 3 may be used as a substantially pure compound (or mixture of compounds) or may be dissolved in a suitable solvent such as a suitable (meth)acrylate or acrylic derivative for example methyl methacrylate.

Another suitable adhesion promoting monomer is hydroxypropylcarbamatacrylate (HPCA) which for example is available commercially from BASF as a 70% solution in ethanol (HPCA 70% EtOH) HPCA has the structure

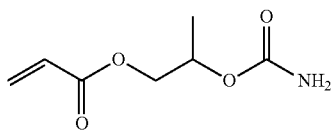

and is useful as a (wet) adhesion promoter and/or cross-linker. It may be biobased and/or produced by enzymes.

Other and/or additional component (d) may be used in those cases where higher molecular weights are desired, such as suitable multi functional (meth)acrylates or divinyl aromatics. Typical examples include di-, tri-, or tetra-functional (meth)acrylates, especially difunctional (meth)acrylates and divinyl benzene. Typical concentrations are less than 10%, more preferred less than 5%, even more preferred between 0.05 and 4%, most preferred between 0.1 and 2.5%, and even most preferred between 0.15 and 1.5% by weight based on total monomers.

Other Aspects of the Invention
Processes

The present invention relates to the selection of the monomers and properties of the resultant copolymer. The polymerisation process by which copolymers of the invention may be prepared is not especially important as any suitable conventional polymerisation process may be used.

In one preferred embodiment of the invention the copolymer is prepared by a bulk polymerisation process. In another preferred embodiment of the invention the copolymer is prepared by a solution polymerisation process. In still other preferred embodiment of the invention the copolymer is prepared by a suspension polymerisation process. In a yet other preferred embodiment of the invention the copolymer is prepared by an emulsion polymerisation process. Details of these techniques are described later.

Chain Transfer Agent (CTA)

In one preference in any embodiment of the invention which uses a polymerisation process where a chain transfer agent may usually have been required (such as but not limited to a radical polymerisation, such as an emulsion polymerisation for example using the low styrene embodiment described herein) the process of the invention uses chain transfer agent in the following total amounts relative to the total monomer composition (i.e. (a)+(b)+(c)) being 100%:

No more than 1 wt-%, preferably no more than 0.5%, more preferably no more than 0.2%, even more preferably no more than 0.1%, most preferably less than 50 ppm, for example no chain transfer agent.

Typical chain transfer agents that have been used in the prior art include mercapto-acids and alkyl esters thereof, carbon tetrabromide, mixtures thereof and cobalt chelate, dodecylmercaptane (DDM) being one of the most commonly used. Mercapto chain transfer agent have been generally used in amounts of less than 1 wt-% based on the total monomer content. Typically cobalt chelate CTAs are used in amounts of less than 50 ppm of Co on total weight of copolymer.

Initator

In one preference in any embodiment of the invention which uses a polymerisation process where an initiator may usually have been required the process of the invention uses initiator in the following total amounts relative to the total monomer composition (i.e. (a)+(b)+(c)) being 100%:

For a bulk or solution polymerisation process, no more than 1 mole-%, preferably no more than 0.5 mole-%, more preferably no more than 0.2 mole-%, even more preferably no more than 0.1 mole-%.

For an emulsion polymerisation process, no more than 1.5 mole-%, preferably no more than 1 mole-%, more preferably no more than 0.75 mole-%, even more preferably no more than 0.5 mole-%.

Initiators for radical polymerization of monomers to make vinyl polymers are well known and are any which are normally suitable for free-radical polymerisation of acrylate monomers. They may be oil-soluble and have low solubility in water such as organic peroxides, organic peroxyesters and organic azo initiators and are generally used in an amount of about 0.1 to 2 wt-% based on the total monomer content.

The applicant has found that in general especially for the embodiment of the invention that has lower amounts of vinyl aromatic monomer then lower amounts of initiator can be used to prepare the itaconate functional polymers of the invention than would be used to prepare polymers where a methacrylate monomer is used (in whole or in part) rather the itaconate functional monomer (component (a)).

Subject to the optional limitations on initiator described herein, initiators that can be used to produce the low molecular weight polymer via solution or bulk polymerization can be any organic peroxide, including hydroperoxides, dialkyl peroxides, and/or alkyl peroxyalkanoates.

Examples of suitable initiators may also comprise any of the following and/or suitable mixtures thereof (as well as chemically similar and/or analogous initiators—for example of the same structural type—as any of those listed below):

All those available commercially from Akzo-Nobel under the Laurox®, Perkadox® and/or Trigonox® trademarks and/or trade designations such as given in parentheses below:

diisobutyryl peroxide (Trigonox® 187-C30 and/or 187-W40);
cumyl peroxyneodecanoate (Trigonox® 99-C75 and/or 99-W50);
di(3-methoxybutyl) peroxydicarbonate (Trigonox® 181);
1,1,3,3-tetramethylbutyl peroxyneodecanoate (Trigonox® 423-C70 and/or 423-W50);
cumyl peroxyneoheptanoate (Trigonox® 197-C75);
tert-amyl peroxyneodecanoate (Trigonox® 123-C75);
the mixtures of peroxydicarbonates available under the trademarks Trigonox® ADC and/or Trigonox® ADC-NS60;
di-sec-butyl peroxydicarbonate (Trigonox® SBP, SBP-C60, SBPS and/or SBPS-C60);
diisopropyl peroxydicarbonate (Perkadox® IPP-NA30 and/or IPP-NA27);
di(4-tert-butylcyclohexyl) peroxydicarbonate (Perkadox® 16S, 16, 16-W75 and/or 16-W40);
di(2-ethylhexyl) peroxydicarbonate (Trigonox® EHP-C75, EHP-W60, EHP-W50, EHP-W40S, EHPS and/or EHPS-C75);

tert-butyl peroxyneodecanoate (Trigonox® 23, 23-C75, 23-C30 and/or 23-W50);
dibutyl peroxydicarbonate (Trigonox® NBP-C50);
dicetyl peroxydicarbonate (Perkadox® 24-FL, 24L and/or 24-W35);
dimyristyl peroxydicarbonate (Perkadox® 26);
1,1,3-tetramethylbutyl peroxypivalate (Trigonox® 425-C75);
tert-butyl peroxyneoheptanoate (Trigonox® 257-C75);
tert-amyl peroxypivalate (Trigonox® 125-C75);
tert-butyl peroxypivalate (Trigonox® 25-C75, 25-C40 and/or 25-C25);
di(3,3,5-trimethylhexanoyl) peroxide (Trigonox® 36-C75, 36-C40, 36-C37.5 and/or 36-W50);
dilauroyl peroxide (Laurox®, Laurox® S and/or Laurox® W-40);
didecanoyl peroxide (Perkadox® SE-10);
2,2-azodi(isobutyronitrile) (Perkadox® AIBN);
2,2-azodi(2-methylbutyronitrile) (Perkadox® AMBN and/or AMBN-GR);
2,5-dimethyl-2,5-di(2-ethylhexanoylperoxy)hexane (Trigonox® 141);
1,1,3,3-tetramethylbutyl peroxy-2-ethylhexanoate (Trigonox® 421);
tert-amyl peroxy-2-ethylhexanoate (Trigonox® 121 and/or 121-C75);
dibenzoyl peroxide (Perkadox® L-W75, L-W75 SF, L-W40, CH-50, API and/or L-DFG) tert-butyl peroxy-2-ethylhexanoate (Trigonox® 21S, 21-C70, 21-C50 and/or 21-C30);
tert-butyl peroxydiethylacetate (Trigonox® 27);
tert-butyl peroxyisobutyrate (Trigonox® 41-C50);
1,1'-azodi(hexahydrobenzonitrile) (Perkadox® ACCN);
1,1-di(tert-butylperoxy)-3,3,5-trimethylcyclohexane (Trigonox® 29, 29-B90 and/or 29-C75);
1,1-di(tert-amylperoxy)cyclohexane (Trigonox® 122-C80);
1,1-di(tert-butylperoxy)cyclohexane (Trigonox® 22-B50, 22-E50 and/or 22-C80);
tert-amylperoxy 2-ethylhexyl carbonate (Trigonox® 131);
tert-amylperoxy acetate (Trigonox® 133-CK60);
tert-butyl peroxy-3,3,5-trimethylhexanoate (Trigonox® 42S, 42-C60 and/or 42-C30);
2,2-di(tert-butylperoxy)butane (Trigonox® D-C50 and/or D-E50);
tert-butylperoxy isopropyl carbonate (Trigonox® BPIC-C75);
tert-butylperoxy 2-ethylhexyl carbonate (Trigonox® 117);
tert-amyl peroxybenzoate (Trigonox® 127);
tert-butyl peroxyacetate (Trigonox® F-C50);
butyl 4,4-di(tert-butylperoxy)valerate (Trigonox® 17);
tert-butyl peroxybenzoate (Trigonox® C and/or C-C75);
dicumyl peroxide (Perkadox® BC-FF);
di(tert-butylperoxyisopropyl)benzene(s) (Perkadox® 14S and/or 14S-FL);
2,5-dimethyl-2,5-di(tert-butylperoxy)hexane (Trigonox® 101, 101-50D-PD, 101-20PP, 101-7.5PP-PD and/or 101-E50);
tert-butyl cumyl peroxide (Trigonox® T);
2,5-dimethyl-2,5-di(tert-butylperoxy)hexyne-3 (Trigonox® 145-E85);
di-tert-butyl peroxide (Trigonox® B, B-C75, B-C50 and/or B-C30);
3,6,9-triethyl-3,6,9-trimethyl-1,4,7-triperoxonane (Trigonox® 301 and/or 301-20PP);
isopropylcumyl peroxide (Trigonox® M-55);
1,1,3,3-tetramethylbutyl hydroperoxide (Trigonox® TMBH-L);
3,3,5,7,7-pentamethyl-1,2,4-trioxepane (Trigonox® 311);
cumyl hydroperoxide (Trigonox® K-90);
tert-butyl hydroperoxide (Trigonox® A-80 and/or A-W70);
tert-amyl hydroperoxide (Trigonox® TAHP-W85); and/or
2,3-dimethyl-2,3-diphenylbutane (Perkadox® 30).

Temperature.

In one preference in any embodiment of the process of the invention (for example low styrene embodiment of the process of the invention) the maximum polymerisation temperature exhibited is as follows:

For a bulk polymerisation process, no more than 275° C., preferably no more than 225° C., more preferably no more than 200° C.

For a solution polymerisation process, no more than 180° C., more preferably no more than 160° C., and most preferably no more than 150° C.

For an emulsion or dispersion polymerisation process, no more than 130° C., more preferably no more than 120° C., and typically no more than 100° C.

It is appreciated that in those cases where the polymerisation temperature is higher than the boiling point of the solvent (or water in the case of emulsion or dispersion polymerisation), this implicates that the polymerisation is performed at a pressure of higher than 1 bar.

Optionally certain copolymers of the invention may also be limited by the following optional provisos:
(I) when component (a) consists of DBI in an amount of less than 30% by weight of the total monomers then the copolymer is substantially free of any chloro group; and
(II) when component (a) consists of DBI in an amount of from 8.5 to 15% by weight of the total monomers the copolymer is prepared by other than an emulsion polymerisation method in which a chaser monomer is used.

Conveniently the composition is substantially free of polyvinyl chloride polymer and/or chlorinated paraffin wax, more preferably is substantially free of any monomer comprising chloro groups, most preferably is substantially free of any species comprising Cl whether as a substituent, atom, di-molecule, ion or otherwise A further aspect of the invention provides a coating composition comprising between 5 and 80 wt-% of a low molecular weight polymer(s) characterized by that the low molecular weight (Low MW) polymer comprises at least 20 wt-% of itaconate functional monomer(s), and has a number average molecular weight of from 500 to 10000 g/mole.

The polymer of the invention has a low number average molecular weight (Low MW polymer) and can be made via emulsion polymerization, dispersion polymerization, (continuous) bulk polymerization or via solution polymerization. The preferred polymerization processes are bulk polymerization and solution polymerization. Where Low MW polymers of the invention are prepared via emulsion, dispersion and/or solution polymerization, the monomer composition can be added in different sequential phases.

The Low MW polymer of the invention is preferably used as colloidal stabilizer in a second stage emulsion polymerization. For this purpose, the acid groups of the low molecular weight polymer are (partially) neutralized and the low molecular weight polymer is (partially) dissolved prior to starting the emulsion polymerization stage. The low MW polymer can, however, also be advantageously used as additive to a second polymer emulsion. In these cases an alkaline solution of the low MW polymer is admixed after the polymerisation process of the second polymer emulsion is completed.

Preferred copolymers of the invention have a polydispersity of from 2 to 2.5, more preferably about 2.5. Therefore suitable desired corresponding values for weight average molecular weight of the copolymers of the invention can be calculated by multiplying each of the values given for number average molecular weight herein by 2.5. Such calculated weight average molecular weight values and ranges are disclosed herein without being recited explicitly.

Broadly there is provided in a yet further aspect of the present invention a process for preparing a copolymer comprising the step of polymerising polymer precursors in a polymerisation method the polymer precursors comprising component (a), component (b) and optionally component (c) as described above to obtain a copolymer.

Preferably the polymerisation method is selected from bulk, solution, suspension and/or emulsion polymerisation, more preferably bulk polymerisation.

Another aspect of the invention broadly provides for a copolymer obtained and/or obtainable by a process of the present invention.

In a yet another embodiment of the invention the copolymer may be prepared by a continuous bulk polymerization for example using a method analogous to that described in WO82/02387 or EP554783. Thus for example the Low MW polymer may be prepared using (continuous) bulk polymerization, preferably using a solvent concentration of less than 40 wt-% (based on solid polymer being 100%), more preferably using less than 20 wt-% of solvent. Examples of suitable solvents and suitable initiators (subject to the optional limitations described herein) can also be found in WO82/02387 or EP554783 the contents of both of which are hereby incorporated by reference.

In the case that the low molecular weight polymer is prepared using solution polymerization, the preferred solvents are those having a boiling point of not more than 130° C., more preferred not more than 100° C., and most preferred not more than 90° C.

Preferred solvents are acetone, methylethyl ketone, methanol, ethanol, i-propanol, ethyl acetate, butyl acetate and/or toluene. Other suitable solvents will be well known to those skilled in the art, In those cases where the polymerization temperature exceeds that of the boiling points of solvent and/or monomer, the polymerization will be performed under increased pressure.

Preferably, the solids content of the solution polymer is at least 40 wt-%, more preferred between 50 and 90 wt-%, most preferred between 60 and 85 wt-%. Usefully the solid polymer of the invention is obtained by removal of substantially all of the solvent used during the solution polymerisation step and the solid polymer so isolated has a solid content of at least 95%, more preferably at least 98%, most preferably at least 99%. Conveniently the solid polymer of the invention obtained by solution polymerisation is isolated in amorphous form (e.g. as flakes or pellets) or in crystalline form (e.g. as needle like crystals).

The low molecular weight polymer prepared via solution polymerization can be dissolved by increasing pH and next be used as is. It is, however, preferred when the solvent used in the polymerization step is removed after the low molecular weight polymer is dissolved is water using a base. Removal of the solvent can be done by increasing temperature or reducing pressure. It is preferred to combine these. Solvent can be removed after dissolving the low molecular weight polymer prior to further use. It can, however, be envisaged that solvent can also be removed after the low molecular weight polymer is used in the subsequent steps that are elaborated below.

Although less preferred the low molecular weight polymer can also be prepared via emulsion polymerization or dispersion polymerization by techniques well known to those skilled in the art.

In a special embodiment where itaconic anhydride or maleic anhydride are used as acid functional monomers, they may be modified after completion of the polymerization. Modification of the anhydride groups can occur with any nucleophilic functionality. Preferred functionalities include hydroxyl groups, hydrazide groups, hydrazine groups, semi-carbazide groups and amine groups. In all cases, modification will result in the introduction of the moiety attached to the hydroxyl, hydrazide, hydrazine, semi-carbazide or amine group and, simultaneously, of an acid group. The remaining acid group can subsequently be used for dissolving the low molecular weight polymer.

The modification can be done with monofunctional hydroxyl groups, hydrazide, or hydrazine, or primary, or secondary amines, but also with di-functional or higher functional hydroxyl, hydrazine, hydrazide, semi-carbazide, or primary or secondary amines. Potential hydroxyl functionalities can include C1-C20 aliphatic, aromatic, or cycloaliphatic mono-, di-, or high functional alcohols. The aliphatic, aromatic, or cycloaliphatic groups can include other functionalities that can, for instance, be used for improved adhesion, crosslinking or other purposes. Typical examples of such functionalities can include phosphate, phosphonate, sulphate, sulphonate, ketone, silane, (cyclic) ureido, (cyclic) carbonate, hydrazide, hydrazine, semi-carbazide, urethane, urea, carbamate, and melamine.

The preferred (poly)amines, (poly) hydrazines, or (poly) hydrazides are well known to those skilled in the art and include those described herein.

When the low molecular weight polymer comprises itaconic anhydride or maleic anhydride that is to be used in a modification step, it is strongly preferred that the anhydride is not hydrolysed prior to the reaction with hydroxyl or amine functional moieties. Hence, in those cases the preferred polymerization methods are bulk polymerization and/or solution polymerization, where the solvent is non-protic.

The low molecular weight polymer of the invention can be dissolved in water according to various procedures especially where it comprises acid functional groups (e.g. introduced by an acid monomer). For example the low molecular weight polymer can be added to water, followed by neutralizing the acid groups to a sufficiently high level, the acid groups of the low molecular weight polymer can be neutralized prior to addition to water, or the water used to dissolve the low MW polymer is neutralised prior to addition of the low MW polymer. Each of these steps can be performed at ambient or at elevated temperatures (i.e. higher than ambient).

A further aspect of the invention provides for a coating composition comprising a low molecular weight polymer as described herein. The low molecular weight polymer can be introduced to the coating composition in different ways, non-limiting examples of which are described below:

The low molecular weight polymer can be blended or admixed for example with a preformed latex. This can be done by dissolving the low molecular weight polymer first and next admixing it with a second emulsion(s) or the low molecular weight polymer can be dissolved in second emulsion(s). The second emulsion(s) can be any type of polymer emulsion, including polyvinyl compositions, comprising sequential, oligomer supported, gradient morphology emulsions, polyurethane emulsions, urethane-acrylate emulsions, alkyd emulsions, and/or polyester emulsions.

The low molecular weight polymer, which is dissolved in water, can be used as a surfactant and/or stabilizer for the emulsion polymerization step. An example of such a process can be found in Comparative example 1 in WO2005/097854.

The low molecular weight polymer can be used as a pigment dispersant for example by added to a coating composition by first mixing it in a pigment dispersion. In this case the low molecular weight polymer is added to a pigment dispersion comprising inorganic pigment particles and the mixture grinded until a stable pigment dispersion is obtained. Next, the pigment dispersion is added to a polymer emulsion(s) to form a pigmented coating.

Preferred application areas for compositions and/or coatings or the invention include wood coatings, such as joinery, industrial wood, parquet, and decorative applications, adhesive and graphic arts applications, such as inks, adhesives, overprint varnishes, film coatings, coatings for application on various plastics, such as polystyrene, polyester, PVC, polypropylene, polyethylene, or application to glass or metal.

Copolymers of the invention may be formed using a number of processes. These include emulsion polymerisation, suspension polymerisation, bulk polymerisation and solution polymerisation. Such processes are extremely well known and need not be described in great detail.

In one embodiment the copolymers of the invention may be made using a bulk polymerisation process. Bulk polymerisation of olefinically unsaturated monomers is described in detail in EP 0156170, WO82/02387, and U.S. Pat. No. 4,414,370 the contents of which are hereby incorporated by reference. In general in a bulk polymerisation process a mixture of two or more monomers are charged preferably continuously into a reactor zone containing molten vinyl polymer having the same ratio of vinyl monomers as the monomer mixture. The molten mixture is maintained at a preset temperature to provide a vinyl polymer of the desired molecular weight. The product is pumped out of the reaction zone at the same rates as the monomers are charged to the reaction zone to provide a fixed level of vinyl monomer and vinyl polymer in the system. The particular flow rate selected will depend upon the reaction temperature, vinyl monomers, desired molecular weight and desired polydispersity.

In another embodiment emulsion polymerisation may be used to form copolymers of the invention. A conventional emulsion process involves dispersing the monomers in an aqueous medium and conducting polymerisation using a free-radical initiator (normally water soluble) and appropriate heating (e.g. 30 to 120° C.) and agitation.

The aqueous emulsion polymerisation can be effected with conventional emulsifying agents (surfactants) being used such as anionic and/or non-ionic emulsifiers. The amount used is preferably low, preferably 0.3 to 2% by weight, more usually 0.3 to 1% by weight based on the weight of total monomers charged.

The aqueous emulsion polymerisation can employ conventional free radical initiators such as peroxides, persulphates and redox systems as are well known in the art. The amount of initiator used is generally 0.05 to 3% based on the weight of total monomers charged.

The aqueous emulsion polymerisation process may be carried out using an "all-in-one" batch process (i.e. a process in which all the components to be employed are present in the polymerisation medium at the start of polymerisation) or a semi-batch process in which one or more of the components employed (usually at least one of the monomers), is wholly or partially fed to the polymerisation medium during the polymerisation. Although not preferred, fully continuous processes could also be used in principle. Preferably a semi-batch process is employed.

The polymerisation technique employed may be such that a low molecular weight polymer is formed, e.g. by employing a chain transfer agent such as one selected from mercaptans (thiols), certain halohydrocarbons and alpha-methyl styrene; or catalytic chain transfer polymerisation using for example cobalt chelate complexes as is quite conventional. Alternatively a controlled radical polymerisation process can be used, for instance by making use of an appropriate nitroxide or a thiocarbonylthio compounds such as dithioesters, dithiocarbamates, trithiocarbonates, and xanthates in order to mediate the polymerization via for example a nitrox mediated polymerisation (NMP), a reversible addition fragmentation chain-transfer process (RAFT) or atom transfer radical polymerization (ATRP).

When the copolymer of the invention is an emulsion polymer it may be mixed with a variety of other polymer emulsions such as those that do not comprise DBI (or higher itaconate esters). Examples of such second polymer emulsions can be polyurethane emulsions, polyurethane-poly (meth)acrylate emulsions, alkyd emulsions, polyester emulsions and/or polyvinyl emulsions. This latter group of copolymer emulsions may comprise oligomer-polymer emulsions, gradient morphology emulsions, sequentially polymerized emulsions, or single phase copolymer emulsions.

The emulsions according to the description above can be produced via emulsion polymerization or via a process called solvent assisted dispersion (SAD) polymerization.

When the copolymer emulsion is produced via emulsion polymerization this can be according to a single feed process, a sequentially fed multi-phase copolymerization process, or a power feed process, resulting in a gradient particle morphology.

In the case of a solution polymerization process, the polymerization is performed in organic solvents. Next, base and/or surfactant are added and the polymer solution is emulsified. Preferably, the solvent is removed via evaporation at the end of the complete process.

Solution polymers can be produced via as single feed solution polymerization or by a sequentially fed multi-phase polymerization. It is also envisaged that a solution polymer, prior or after the optional removal of the solvent, is used as a seed for an emulsion polymerization stage. In this case, the polymer emulsion prepared according to the solution polymerisation process is used as seed in a batch or semi-batch polymerization process.

The preferred polymerization process is a bulk of solution polymerisation.

Surfactants are used in emulsion polymerization as known to those skilled in the art. Typical surfactants have been extensively described in all kinds of patent applications. The choice and concentration of surfactants are not deemed to be critical for this invention. The aqueous emulsion polymerisation can be effected with conventional emulsifying agents (surfactants) being used such as anionic and/or non-ionic emulsifiers. The amount used is preferably low, preferably 0.3 to 2% by weight, more usually 0.3 to 1% by weight based on the weight of total monomers charged to make the polymer.

Preferably (and subject to the provisos herein) in one embodiment of the invention the process of making a copolymer emulsion of the invention comprises using a chaser monomer composition as described in WO2011073417. In another embodiment a chaser monomer may optionally not be used.

In a preferred case the residual monomer content of the low MW copolymer emulsion is below 2000 mg/L, more preferred below 1500 mg/L, most preferred below 1000 mg/L, and especially preferred below 550 mg/L.

If it is desired to crosslink polymers (for example in a polymer dispersion), the relevant low MW copolymers can carry functional groups such as hydroxyl groups and the dispersion subsequently formulated with a crosslinking agent such as a polyisocyanate, melamine, or glycoluril; or the functional groups on one or both polymers could include keto or aldehyde carbonyl groups and the subsequently formulated crosslinker in step c) could be a polyamine or polyhydrazide such as adipic acid dihydrazide, oxalic acid dihydrazide, phthalic acid dihydrazide, terephthalic acid dihydrazide, isophorone diamine and 4,7-dioxadecane-1,10 diamine. It will be noted that such crosslinking agents will effect crosslinking by virtue of forming covalent bonds.

Whilst the term vinyl polymer is commonly used to refer to thermoplastic polymers derived by polymerization from compounds containing the vinyl group ($CH_2=CH-$), the term "vinyl polymer" is used herein more broadly to denote any polymer (whether thermoplastic or not) that comprises (e.g. as repeat units therein) and/or is derived from monomers and/or polymer precursors comprising one or more of the following moieties: activated unsaturated moieties (such as acrylates and/or methacrylates); any olefinically unsaturated moieties (such as vinyl moieties); mixtures thereof; and/or combinations thereof within the same moiety.

There is an increasing demand to use bio-renewable monomers in order to improve the sustainability of the polymers used in for example coating applications. In view of concerns about depletion of fossil fuel resources or an increase in carbon dioxide in the air that poses a global-scale environmental problem in recent years, methods for producing raw materials of these polymers from biomass resources have attracted a lot of attention. Since these resources are renewable and therefore have a carbon-neutral biomass, such methods are expected to gain in particular importance in future. It is therefore a preferred feature of the present invention and the aspects described herein that where possible the monomers (especially the higher itaconate diesters such as DBI) as far as possible are biorenewable.

Preferably at least 20 wt-%, more preferably at least 30 wt-%, and especially 40 wt-% of the olefinically unsaturated monomers used to form the polymers of the invention are derived from at least one bio-renewable olefinically unsaturated monomer. Bio-renewable monomers may be obtained fully or in part from bio-renewable sources. In a preferred embodiment methacrylate monomers are used as monomer (c) where the alcohol is made from biorenewable sources. In yet another preferred embodiment both the (meth)acrylate unit and the possible alcohol are made from biorenewable sources. Thus it is preferred to also measure the carbon-14 content to determine the biorenewability.

The content of carbon-14 (C-14) is indicative of the age of a bio-based material. It is known in the art that C-14, which has a half life of about 5,700 years, is found in bio-renewable materials but not in fossil fuels. Thus, "bio-renewable materials" refer to organic materials in which the carbon comes from non-fossil biological sources. Examples of bio-renewable materials include, but are not limited to, sugars, starches, corns, natural fibres, sugarcanes, beets, citrus fruits, woody plants, cellulosics, lignocelluosics, hemicelluloses, potatoes, plant oils, other polysaccharides such as pectin, chitin, levan, and pullulan, and a combination thereof.

C-14 levels can be determined by measuring its decay process (disintegrations per minute per gram carbon or dpm/gC) through liquid scintillation counting. In one embodiment of the present invention, polymer A and or polymer B comprise at least about 1.5 dpm/gC (disintegrations per minute per gram carbon) of carbon-14, more preferably at least 2 dpm/gC, most preferably at least 2.5 dpm/gC, and especially at least 4 dpm/gC.

Acrylic acid can be made from glycerol, as is disclosed by Arkema, or from lactic acid as described by U.S. Pat. No. 7,687,661. Methacrylic acid can be prepared from ethene, methanol and carbon monoxide (all bio-renewable), as disclosed by Lucite International Ltd.

Olefinically unsaturated bio-renewable monomers which may additionally provide a contribution to improved coating properties include α-methylene butyrolactone, α-methylene valerolactone, α-methylene γ-$R^3$ butyrolactone ($R^3$ can be an optionally substituted alkyl or optionally substituted aryl); itaconates such as dialkyl itaconates (including DBI) and monoalkyl itaconates, itaconic acid, itaconic anhydride, crotonic acid and alkyl esters thereof, citraconic acid and alkyl esters thereof, methylene malonic acid and its mono and dialkyl esters, citraconic anhydride, mesaconic acid and alkyl esters thereof.

Another useful set of useful bio-renewable monomers include N—$R^2$, α-methylene butyrolactam ($R^2$ can be an optionally substituted alkyl or optionally substituted aryl); N—$R^2$, α-methylene γ-$R^1$ butyrolactam; N-alkyl itaconimids; furfuryl (meth)acrylate; fatty acid functional (meth)acrylates such as DAPRO FX-522 from Elementis and Visiomer® MUMA from Evonik.

It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination.

The object of the present invention is to solve some or all of the problems or disadvantages (such as identified throughout the application herein) with the prior art.

Unless the context clearly indicates otherwise, as used herein plural forms of the terms herein are to be construed as including the singular form and vice versa.

The term "comprising" as used herein will be understood to mean that the list following is non-exhaustive and may or may not include any other additional suitable items, for example one or more further feature(s), component(s), ingredient(s) and/or substituent(s) as appropriate.

The terms 'effective', 'acceptable' 'active' and/or 'suitable' (for example with reference to any process, use, method, application, preparation, product, material, formulation, compound, monomer, oligomer, polymer precursor, and/or polymers described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

Preferred utility of the present invention comprises as component of a coating composition.

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

Thus for example a substance stated as present herein in an amount from 0 to "x" (e.g. in units of mass and/or weight %) is meant (unless the context clearly indicates otherwise) to encompass both of two alternatives, firstly a broader alternative that the substance may optionally not be present (when the amount is zero) or present only in an de-minimus amount below that can be detected. A second preferred alternative (denoted by a lower amount of zero in a range for amount of substance) indicates that the substance is present, and zero indicates that the lower amount is a very small trace amount for example any amount sufficient to be detected by suitable conventional analytical techniques and more preferably zero denotes that the lower limit of amount of substance is greater than or equal to 0.001 by weight % (calculated as described herein).

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non-exhaustive the sum of the percentage for each of such components may be less than 100% to allow a certain percentage for additional amount(s) of any additional component(s) that may not be explicitly described herein.

In the present invention, unless the context clearly indicates otherwise, an amount of an ingredient stated to be present in the composition of the invention when expressed as a weight percentage, is calculated based on the total amount of monomers in the composition being equivalent to 100% (thus for example components (a)+(b)+(c)+(d) total 100%). For convenience certain non-monomer ingredients (such as for example chain transfer agents (CTA)) which fall outside the definitions of any of components (a) to (d) may also be calculated as weight percentages based on total monomer (i.e. where the weight of total monomers alone is set at 100%). As the weight % of monomers (for example for components (a) to (d)) by definition total 100% it will be seen that using monomer based weight % values for the non-monomer ingredients (i.e. those components outside (a) to (d)) will mean the total percentages will exceed 100%.

Thus amounts of non-monomer ingredients expressed as monomer based weight percentages can be considered as providing a ratio for the weight amounts for these ingredients with respect to the total weight of monomers which is used only as a reference for calculation rather than as a strict percentage. Further ingredients are not excluded from the composition when (a)+(b)+(c)+(d) total 100% and weight percentages based on total monomers should not be confused with weight percentages of the total composition.

The term "substantially" and/or "substantially comprises" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole.

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulphonyl if directly attached to each other represent a sulphamoyl group). Preferred optional substituents comprise: carboxy, sulpho, hydroxy, amino, mercapto, cyano, methyl, halo, trihalomethyl and/or methoxy.

The synonymous terms "organic substituent", "moiety", and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulphur, more preferably from hydrogen, nitrogen, oxygen, phosphorus and/or sulphur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbo group' as used herein is a sub-set of an organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbo groups may comprise one or more of the following groups. Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valences of which are not engaged in a double bond (for example alkylene). Hydrocarbylidene groups comprise divalent groups (which may be represented by "$R_2C=$") formed by removing two hydrogen atoms from the same carbon atom of a hydrocarbon, the free valences of which are engaged in a double bond (for example alkylidene). Hydrocarbylidyne groups comprise trivalent groups (which may be represented by "$RC\equiv$"), formed by removing three hydrogen atoms from the same carbon atom of a hydrocarbon the free valences of which are engaged in a triple bond (for example alkylidyne). Hydrocarbo groups may also comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups The term 'alkyl' or its equivalent (e.g. 'alk') as used herein may be readily replaced, where appropriate and unless the context clearly indicates otherwise, by terms encompassing any other hydrocarbo group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbo species linking two or more moieties (such as bivalent hydrocarbylene radicals e.g. alkylene).

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example $C_{1-N}$organo, signifies a organo moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Preferably any of the organo groups listed herein comprise from 1 to 36 carbon atoms, more preferably from 1 to 18. It is particularly preferred that the number of carbon atoms in an organo group is from 1 to 12, especially from 1 to 10 inclusive, for example from 1 to 4 carbon atoms.

As used herein chemical terms (other than IUAPC names for specifically identified compounds) which comprise features which are given in parentheses—such as (alkyl)acrylate, (meth)acrylate and/or (co)polymer—denote that that part in parentheses is optional as the context dictates, so for example the term (meth)acrylate denotes both methacrylate and acrylate.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cyptands/cryptades, inclusion compounds, intercalation compounds, interstitial compounds, ligand complexes, organometallic complexes, non-stoichiometric complexes, Tr-adducts, solvates and/or hydrates); isotopically substituted forms, polymeric configurations [such as homo or copolymers, random, graft and/or block polymers, linear and/or branched polymers (e.g. star and/or side branched), cross-linked and/or networked polymers, polymers obtainable from di and/or trivalent repeat units, dendrimers, polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective as defined herein.

Polymers of the present invention may be prepared by one or more suitable polymer precursor(s) which may be organic and/or inorganic and comprise any suitable (co)monomer(s), (co)polymer(s) [including homopolymer(s)] and mixtures thereof which comprise moieties which are capable of forming a bond with the or each polymer precursor(s) to provide chain extension and/or cross-linking with another of the or each polymer precursor(s) via direct bond(s) as indicated herein.

Polymer precursors of the invention may comprise one or more monomer(s), oligomer(s), polymer(s); mixtures thereof and/or combinations thereof which have suitable polymerisable functionality. It will be understood that unless the context dictates otherwise term monomer as used herein encompasses the term polymer precursor and does not necessarily exclude monomers that may themselves be polymeric and/or oligomeric in character.

A monomer is a substantially monodisperse compound of a low molecular weight (for example less than one thousand g/mole) which is capable of being polymerised.

A polymer is a polydisperse mixture of macromolecules of large molecular weight (for example many thousands of g/mole) prepared by a polymerisation method, where the macromolecules comprises the multiple repetition of smaller units (which may themselves be monomers, oligomers and/or polymers) and where (unless properties are critically dependent on fine details of the molecular structure) the addition or removal one or a few of the units has a negligible effect on the properties of the macromolecule.

A oligomer is a polydisperse mixture of molecules having an intermediate molecular weight between a monomer and polymer, the molecules comprising a small plurality of monomer units the removal of one or a few of which would significantly vary the properties of the molecule.

Depending on the context the term polymer may or may not encompass oligomer.

The polymer precursor of and/or used in the invention may be prepared by direct synthesis or (if the polymeric precursor is itself polymeric) by polymerisation. If a polymerisable polymer is itself used as a polymer precursor of and/or used in the invention it is preferred that such a polymer precursor has a low polydispersity, more preferably is substantially monodisperse, to minimise the side reactions, number of by-products and/or polydispersity in any polymeric material formed from this polymer precursor. The polymer precursor(s) may be substantially un-reactive at normal temperatures and pressures.

Except where indicated herein polymers and/or polymeric polymer precursors of and/or used in the invention can be (co)polymerised by any suitable means of polymerisation well known to those skilled in the art. Examples of suitable methods comprise: thermal initiation; chemical initiation by adding suitable agents; catalysis; and/or initiation using an optional initiator followed by irradiation, for example with electromagnetic radiation (photo-chemical initiation) at a suitable wavelength such as UV; and/or with other types of radiation such as electron beams, alpha particles, neutrons and/or other particles.

The substituents on the repeating unit of a polymer and/or oligomer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or cross linking with such other resins as appropriate.

Another aspect of the invention broadly provides a coating composition comprising the polymers and/or beads of the present invention and/or as described herein.

A further aspect of the invention provides a coating obtained or obtainable from a coating composition of the present invention.

A yet other aspect of the invention broadly provides a substrate and/or article having coated thereon an (optionally cured) coating composition of the present invention.

A yet further aspect of the invention broadly provides a method of using polymers of the present invention and/or as described herein to prepare a coating composition.

A still further aspect of the invention broadly provides a method for preparing a coated substrate and/or article comprising the steps of applying a coating composition of the present invention to the substrate and/or article and optionally curing said composition in situ to form a cured coating thereon. The curing may be by any suitable means, such as thermally, by radiation and/or by use of a cross-linker.

Preferred coating compositions are solvent coating compositions or aqueous coating compositions, more preferably are aqueous coating compositions.

Optionally aqueous coating compositions may also comprise a co-solvent. A co-solvent, as is well known in the coating art, is an organic solvent employed in an aqueous composition to ameliorate the drying characteristics thereof, and in particular to lower its minimum film forming temperature. The co-solvent may be solvent incorporated or used during preparation of polymers of the invention or may have been added during formulation of the aqueous composition.

The compositions of the invention are particularly useful as or for providing the principle component of coating formulations (i.e. composition intended for application to a substrate without further treatment or additions thereto) such as protective or decorative coating compositions (for example paint, lacquer or varnish) wherein an initially prepared composition optionally may be further diluted with water and/or organic solvents, and/or combined with further ingredients or may be in more concentrated form by optional evaporation of water and/or organic components of the liquid medium of an initially prepared composition.

The compositions of the invention may be used in various applications and for such purposes may be optionally further combined or formulated with other additives and/or components, such as defoamers, rheology control agents, thickeners, dispersing and/or stabilizing agents (usually surfactants and/or emulsifiers), wetting agents, fillers, extenders, fungicides, bactericides, coalescing and wetting solvents or co-solvents (although solvents are not normally required), plasticisers, anti-freeze agents, waxes, colorants, pigments, dyes, heat stabilisers, levelling agents, anti-cratering agents, fillers, sedimentation inhibitors, UV absorbers, antioxidants, reactive diluents, neutralising agents, adhesion promoters and/or any suitable mixtures thereof.

The aforementioned additives and/or components and the like may be introduced at any stage of the production process or subsequently. It is possible to include fire retardants (such as antimony oxide) to enhance fire retardant properties.

The compositions of the invention may also be blended with other polymers such as vinyl polymers, alkyds (saturated or unsaturated), polyesters and or polyurethanes.

The coating composition of the invention may be applied to a variety of substrates including wood, board, metals, stone, concrete, glass, cloth, leather, paper, plastics, foam and the like, by any conventional method including brushing, dipping, flow coating, spraying, and the like. The coating composition of the invention may also be used to coat the interior and/or exterior surfaces of three-dimensional articles. The coating compositions of the invention may also be used, appropriately formulated if necessary, for the provision of films, polishes, varnishes, lacquers, paints, inks and adhesives. However, they are particularly useful and suitable for providing the basis of protective coatings for substrates that comprise wood (e.g. wooden floors), plastics, polymeric materials, paper and/or metal.

The carrier medium may be removed from the compositions of the invention once they have been applied to a substrate by being allowed to dry naturally at ambient temperature, or the drying process may be accelerated by heat. Crosslinking can be developed by allowing to stand for a prolonged period at ambient temperature (several days) or by heating at an elevated temperature (e.g. 50° C.) for a much shorter period of time.

A still further aspect of the present invention comprises paints obtained, obtainable and/or comprising polymer compositions of the invention, especially where polymers compositions of the invention are emulsion polymers. Thus for example paint made from the emulsion polymer compositions of this invention may contain pigment at pigment volume concentrations in the range of 0 to 85%, preferably in the range of 0 to 55%. The pigment volume concentration of a species of pigment particles is the percentage of the volume occupied by that species of pigment particles, based on the total volume of the dried coating prepared from the emulsion polymer compositions. Suitable pigments include inorganic pigments, such as titanium dioxide, iron oxide, zinc oxide, magnesium silicate, calcium carbonate, organic and inorganic coloured pigments, aluminosilicates, silica, and various clays. Titanium dioxide is a preferred for its ability to provide opacity. Suitable organic pigments also include plastic pigments such as solid bead pigments and microsphere pigments containing voids or vesicles. Examples of solid bead pigments include polystyrene and polyvinyl chloride beads. Examples of microsphere pigments, which include polymer particles containing one or more voids and vesiculated polymer particles, are disclosed in U.S. Pat. Nos. 4,427,836, 4,920,160, 4,594,363, 4,469,825, 4,468,498, 4,880,842, 4,985,064, 5,157,084, 5,041,464, 5,036,109, 5,409,776 and 5,510,422. Other suitable pigments include, for example, Expancel™ 551 DE20 acrylonitrile/vinyl chloride expanded particles (Expancel Inc. Duluth Ga.); Sil-Cell™ 35/34 sodium potassium aluminium silicate particles (Silbrico Corporation, Hodgkins Ill.); Dualite™ 27 polyvinylidene chloride copolymer coated with $CaCO_3$ (Pierce and Stevens Corporation, Buffalo N.Y.); Fillitte™150 ceramic spherical particles (Trelleborg Fillite Inc. Norcross Ga.); Microbeads™4A soda lime particles (Cataphote Inc.); Sphericell™ hollow glass particles (Potter Industries Inc. Valley Forge Pa.); Eccosphere™ hollow glass spheres (New Metals & Chemicals Ltd.; Essex England); Z-light™ Zeeospheres W-410 and W-610 ceramic hollow spheres (3M St. Paul Minn.); Scotchlite™ K46 glass bubbles (3M St. Paul Minn.); Vistamer™ UH 1500 polyethylene particles; and Vistamer™ HD 1800 polyethylene particles (Fluoro-Seal Inc., Houston Tex.). Ropaque™ Polymer is a preferred component in the coatings. Z-light™ Zeeospheres W-410 and W-610 ceramic hollow spheres are also preferred components. Combinations of the above ingredients are frequently preferred.

Paints prepared from emulsion polymer compositions comprising low molecular weight polymer of this invention may be thickened with various aqueous thickening agents. These include but not are limited to hydrophobically modified alkali swellable emulsion such Acrysol™ TT-935, Acrysol™ TT-615, Acrysol™ RM-6, Polyphobe™ TR-116. Alkali swellable emulsions such as Acrysol™ ASE-60 may also be used. Hydrophobically modified water soluble polymers may also be used such as Acrysol™ RM-2020, Acrysol™ RM-8, Aquaflow™ XLS-500, Aquaflow™ NHS-310, Rheolate™ CVS-11, and hydrophobically modified HEC such as Natrosol™ Plus 330. Hydroxyethyl cellulose may also be used such as Natrosol™ HBR, or Cellosize™ QP-3000. Clays such as Attagel™ 50 or Bentone™ DE may also be used for sagging and settling control.

Paints prepared from emulsion polymer compositions comprising low molecular weight polymer of this invention may utilize dispersants to help stabilize the pigments in the paint. Polyacid dispersants such as Hydropalat™ 44, or hydrophobic copolymer dispersants such as Tamol™ 681, Tamol™ 165, and Tamol™ 731 may be used. Styrene Maleic anhydride copolymers may also be used. Small molecule dispersants such as polyphosphates and citric acid may also be used. Examples of polyphosphates include tetra-potassium pyrophosphate, potassium tripolyphosphate, sodium hexameta phosphate, and higher phosphates sold under the trade name Calgon™. The latter phosphates are used in conjunction with ZnO pigments to help provide stability.

Paints prepared from emulsion polymer compositions comprising low molecular weight polymer of this invention may utilize coalescing aids to aid in the film formation of the latex emulsion polymers. These coalescing aids can be volatile such as ethoxy and propoxy ethers of common alcohols. Examples include ethylene glycol monobutyl ether, diethylene glycol monobutyl ether, propylene glycol monobutyl, and dipropylene glycol monobutyl ether. A common and preferred coalescing agent is Texanol™. Paints prepared from the emulsion polymer compositions of this invention may also utilize non volatile coalescing agents which do not contribute to VOC's. These coalescing agents would include materials like Optifilm™ 400, Dioctyl maleate, triethyl citrate, or tributyl phosphate. In some instances oxidatively curing reactive plasticizers such as Oxi-Cure™ 100 may be used. In addition the paint may also contain a humectant material such as ethylene glycol or propylene glycol. Open time additives such as Rhodaline™ OTE, or Optifilm™ OT1200 may also be used. It is preferred that the paint made from the emulsion polymer compositions contain less than 5% VOC by weight based on total weight of the composition. More preferred are paint compositions containing less than 2% VOC by weight, and most preferred are paint compositions containing less than 0.05% VOC by weight.

Paints prepared from emulsion polymer compositions comprising low molecular weight polymer of this invention will also contain added surfactants. These surfactants are used to improve substrate wetting, insure pigment and colorant compatibility, and improve stability. Nonionic surfactants such as ethoxylated alcohols are frequently added to improve free/thaw stability and colorant compatibility. These would include low HLB nonionics such as Igepal™ CO-430, Igepal™ CO-630 and higher HLB nonionics such as Triton X-405. For these surfactants it is also desirable to use analogs based on alkyl alcohols such as tridecyl alcohol, or branched secondary alcohols such as Tergitol™ TMN-10. Triton™ CF-10 is also quite commonly used to aid in pigment wetting. Dioctyl sulfosuccinates are frequently used to enhance substrate wetting such as Aerosol™ OT-100. Acetylenic diols such as Surfynol™ 104 can also be used and are sometimes desired due to their low dynamic surface tension. Phosphate based surfactants can also be employed particularly to improve TiO2 compatibility and stability. These would include surfactants from the Strodex™ line such as PK-90 or PK-0VOC.

Paints prepared from emulsion polymer compositions comprising low molecular weight polymer of this invention may also contain additives which can alter the surface blocking characteristics. Such additives would include fluorocarbon surfactants such as Capstone™ FS-61.

Paints prepared from the emulsion polymer compositions of this invention may also contain multivalent metal ions to provide for post film formation crosslinking. These multivalent metal ions will improve the hardness, and scratch resistance of the final paint as well as to improve the chemical resistance. In particular it is seen that this will improve resistance to organic solvents. Examples of multivalent metal ions include Zn, Mg, Zr, and Ca. These are frequently added in the form of water soluble salts such as acetates or carbonates. Zinc Ammonium Carbonate is frequently used to great advantage; however $Mg(OH)_2$ is also effective and sometimes desired.

Paints prepared from emulsion polymer compositions comprising low molecular weight polymer of this invention may contain phosphate or borosilicate based corrosion inhibiting pigments such as Heucophos™ ZPO, Halox™ SPZ-391, Halox™ SZP-391 JM, Halox™ 430, or Halox™ CW-291. The paints prepared from the emulsion polymer compositions of this invention may contain organic corrosion inhibitors such as Halox™ 510, Halox™ 520 or Halox™ 570. The paints prepared from the emulsion polymer compositions of this invention may contain flash rust inhibitors such as nitrite salts, phosphate salts, benzoic acid salts, or Halox™ Flash-X 330. These ingredients are typically added to a direct to metal coating to reduce flash rusting and long term corrosion.

Paints prepared from emulsion polymer compositions comprising low molecular weight polymer of this invention may contain tannin stain blocking additives to block the migration of tannins through the coating. These additives are typically based on multivalent cations such as $Zr^{2+}$ and $Zn^{2+}$ or solid inorganic materials capable of binding negatively charged tannins. The additives would include Stainban™ 185, Stainban™ 186, Stainban™ 187, Halox™ BW-100, Halox™ L-44, and Halox™ I-66. In addition ZnO is frequently added to these paints to improve tannin stain blocking. In many instances it is particularly desired to prepare paints which contain inorganic pigments with high aspect ratios. An example would be a platy talc such as Vertal™ 7. This is known to improve the tannin blocking character of the paint.

Paints prepared from emulsion polymer compositions comprising low molecular weight polymer of this invention may contain UV absorbers and free radical scavengers. These are used to improve the long term exterior durability of a coating, or to protect the underlying substrate from UV degradation. This is particularly useful when formulating clear to semi transparent wood stains. The UV blockers can be organic materials such as benzotriazoles, or can be inorganic UV blockers such as sub 100 nm metal oxides. The free radical scavengers are based on hindered amine light stabilizers. Examples of UV blockers include Tinuvin 1130, trans iron oxides such as Tint-ayd CW5499 or Tint-ayd CW5600, nano zinc oxide, and nano titanium oxide. Combinations of Tinuvin 1130 with Tint-ayd CW5499 are particularly useful for semi transparent wood stains.

Paints prepared from emulsion polymer compositions comprising low molecular weight polymer of this invention may contain waxes or surface modification additives such as silicone slip aids. Waxes may be used to reduce the gloss of the paint and maintain a high level of coffee, wine, or tea stain resistance. These waxes also can improve the burnish resistance of the coating. Examples of such waxes include Ceraflour™ 916, Ceraflour™ 920, and Ceraflour™ 962. Waxes may also be used to improve the mar and scratch resistance of the paint. An example would be Michem Emulsion™ 39235. Slicone slip aids may also be used to improve mar and scratch. An example would be Tego Glide™ 410.

Paints prepared from emulsion polymer compositions comprising low molecular weight polymer of this invention may contain reactive silanes which contain an epoxy group or an amine group. The silane can be a trialkoxy, a dialkoxy, or a mono alkoxy. The alkoxy groups are typically methoxy, ethoxy, or propoxy. In the case of the dialkoxy, or a mono alkoxy materials the silicon atom is bonded to a methyl group. For example, monomethyldimethoxy silane would be common siloxane group. Trialkoxy, and dialkoxy silanes based on methoxy or ethoxy are preferred. The emulsion polymer may also contain reactive groups such as epoxy or acetoacetoxy which can react with the amine functional portion of the amino silane. An example of a useful amino silane would be Silquest A-1100 which is □-amino propyl-triethoxysilane. □-amino propylmethyldimethoxysilane is a useful coupling agent for adhesion to metal oxides such as aluminium oxide. An example of useful epoxy silanes are Silquest A-186 and Silquest A-187. The silanes are typically used at around 1% and provide for adhesion to metals and metal oxide surfaces. They can also be used to crosslink the paint.

Many other variations embodiments of the invention will be apparent to those skilled in the art and such variations are contemplated within the broad scope of the present invention.

Further aspects of the invention and preferred features thereof are given in the claims herein.

Tests
Minimum Film Forming Temperature

The minimum film forming temperature (MFFT) of a dispersion as used herein is the temperature where the dispersion forms a smooth and crack free coating or film using DIN 53787 and when applied using a Sheen MFFT bar SS3000.

Koenig Hardness

Koenig hardness as used herein is a standard measure of hardness, being a determination of how the viscoelastic properties of a film formed from the dispersion slows down a swinging motion deforming the surface of the film, and is measured according to DIN 53157 NEN5319.

Glass Transition Temperature (Tg)

As is well known, the glass transition temperature of a polymer is the temperature at which it changes from a glassy, brittle state to a plastic, rubbery state. The glass transition temperatures may be determined experimentally using Differential Scanning calorimetry (DSC), taking the peak of the derivative curve as Tg, or calculated from the Fox equation. Thus the Tg, in degrees Kelvin, of a copolymer having "n" copolymerised comonomers is given by the weight fractions W of each comonomer type and the Tgs of the homopolymers (in degrees Kelvin) derived from each comonomer according to the equation:

$$\frac{1}{Tg} = \frac{W_1}{Tg_1} + \frac{W_2}{Tg_2} + \ldots \frac{W_n}{Tg_n}$$

The calculated Tg in degrees Kelvin may be readily converted to ° C.

Solids Content

The solids content of an aqueous dispersion of the invention is usually within the range of from about 20 to 65 wt-% on a total weight basis, more usually 30 to 55 wt-%. Solids content can, if desired, be adjusted by adding water or removing water (e.g. by distillation or ultrafiltration).

pH Value

The pH value of the dispersion of the invention can be from 2 to 10 and mostly is from 6 to 9.5.

Blocking
Block Resistance Measurement [Includes Blocking and Early Blocking]:
Step 1: Blocking:

A 100 micron wet film of the aqueous emulsion of the invention to which 10% butyldiglycol is added is cast on to a paper substrate and dried for 16 hours at 52° C.

Step 1: Early Blocking:

A 250 micron wet film of the aqueous emulsion of the invention to which 10% butyldiglycol was added, is cast on to a paper substrate and dried for 24 hours at room temperature.

Step 2: Blocking and Early Blocking:

After cooling down to room temperature two pieces of coated film are placed with the coated side against each other under a load of 1 Kg/cm.sup.2 for 4 hours at 52° C. After this time interval the load on the samples is removed and the samples are left to cool down to room temperature (22+−2° C.). When the two coatings can be removed from each other without any damage to the film (do not stick) the block resistance is very good and assessed as a 5. When they however completely stick together, block resistance is very bad and assessed as a 0.

Gas Chromatography Mass Spectrometry (GCMS)

to confirm polymerisation is substantially complete the content of free itaconate ester monomers content can be determined by GCMS. The GCMS analyses were performed on a Trace GC-DSQ MS (Interscience, Breda, the Netherlands) equipped with a CTC combi Pal robotic autosampler for head space has been used. The carrier gas was Helium and a CP Sil 5 low bleed/MS, 25 m×0.25 mm i.d., 1.0 μm (CP nr. 7862) column has been used.

The GC-oven was programmed from 50° C. (5 min) followed by different sequential temperature ramps of 5° C./min to 70° C. (0 min), 15° C./min to 220° C. (0 min), and ending with 25° C./min to 280° C. (10 min). A continuous Helium flow of 1.2 ml/min was used. A hot split injection at 300° C. was performed on a programmed temperature vaporizer (PTV). The injection volume was 1 μl. The MS transfer line and ion source were both kept at 250° C. The samples were measured with single ion monitoring (SIM). For the specific case of dibutyl itaconate (DBI) the masses 127.0 and 59.0 Da were used, for the internal standard (iso butyl acrylate) the masses 55.0 and 73.0 were applied. The sample solutions were approximately 500 mg in 3 ml of internal standard solution (iso butyl acrylate in acetone). The calibration was performed with 5 different concentration levels from 0 to 500 ppm. The calculation was performed using Microsoft Excel with a linear calibration curve.

Molecular Weight

Unless the context clearly dictates otherwise the term molecular weight of a polymer or oligomer as used herein denotes number average molecular weight (also denoted as $M_N$). $M_N$ may be measured by any suitable conventional method for example by Gas Phase Chromatography (GPC—performed similarly to the GCMS method described above) and/or by the SEC method described below. GPC method is preferred Determination of molecular weight of a polymer using SEC The molecular weight of a polymer may also be determined using Size Exclusion Chromatography (SEC) with tetrahydrofuran as the eluent or with 1,1,1,3,3,3 hexafluoro isopropanol as the eluent.

1) tetrahydrofuran

The SEC analyses were performed on an Alliance Separation Module (Waters 2690), including a pump, auto injector, degasser, and column oven. The eluent was tetrahydrofuran (THF) with the addition of 1.0 vol % acetic acid. The injection volume was 150 μl. The flow was established at 1.0 ml/min. Three PL MixedB (Polymer Laboratories) with a guard column (3 μm PL) were applied at a temperature of 40° C. The detection was performed with a differential refractive index detector (Waters 410). The sample solutions were prepared with a concentration of 20 mg solids in 8 ml THF (+1 vol % acetic acid), and the samples were dissolved for a period of 24 hours. Calibration is performed with eight polystyrene standards (polymer standard services), ranging from 500 to 4,000,000 g/mol. The calculation was performed with Millennium 32 software (Waters) with a third order calibration curve. The obtained molar masses are polystyrene equivalent molar masses (g/mol).

2) 1,1,1,3,3,3 hexafluoro isopropanol

The SEC analyses were performed on a Waters Alliance 2695 (pump, degasser and autosampler) with a Shodex RI-101 differential refractive index detector and Shimadzu CTO-20AC column oven. The eluent was 1,1,1,3,3,3 hexafluoro isopropanol (HFIP) with the addition of 0.2M potassium trifluoro acetate (KTFA). The injection volume was 500. The flow was established at 0.8 ml/min. Two PSS PFG Linear XL columns (Polymer Standards Service) with a guard column (PFG PSS) were applied at a temperature of 40° C. The detection was performed with a differential refractive index detector. The sample solutions were prepared with a concentration of 5 mg solids in 2 ml HFIP (+0.2M KTFA), and the samples were dissolved for a period of 24 hours. Calibration is performed with eleven polymethyl methacrylate standards (polymer standard services), ranging from 500 to 2,000,000 g/mol. The calculation was performed with Empower Pro software (Waters) with a third order calibration curve. The molar mass distribution is obtained via conventional calibration and the molar masses are polymethyl methacrylate equivalent molar masses (g/mol).

Standard Conditions

As used herein, unless the context indicates otherwise, standard conditions (e.g. for drying a film) means a relative humidity of 50%±5%, ambient temperature (which denotes herein a temperature of 23° C.±2°) and an air flow of ≤ (less than or equal to) 0.1 m/s and atmospheric pressure.

The following examples are provided to further illustrate the processes and compositions of the present invention. These examples are illustrative only and are not intended to limit the scope of the invention in any way. Unless otherwise specified all parts, percentages, and ratios are on a weight basis. The prefix C before an example indicates that it is comparative.

Various registered trademarks, other designations and/or abbreviations are used herein to denote some of ingredients used to prepare polymers and compositions of the invention. These are identified below by chemical name and/or tradename and optionally their manufacturer or supplier from whom they are available commercially. However where a chemical name and/or supplier of a material described herein is not given it may easily be found for example in reference literature well known to those skilled in the art: such as: 'McCutcheon's Emulsifiers and Detergents', Rock Road, Glen Rock, N.J. 07452-1700, USA, 1997 and/or Hawley's Condensed Chemical Dictionary (14th Edition) by Lewis, Richard J., Sr.; John Wiley & Sons.

In the examples the following abbreviations/monomers may be used:

DBI denotes dibutyl itaconate (may be (partly) bio-renewable)

DEI denotes diethyl itaconate (may be (partly) bio-renewable)

DMI denotes dimethyl itaconate (may be (partly) bio-renewable)

MMA denotes methyl methacrylate (may be (partly) bio-renewable)

BA denotes butyl acrylate (may be (partly) bio-renewable)

STY denotes styrene

IA denotes itaconic acid (may be bio-renewable)

IANH denotes itaconic anhydride (may be bio-renewable)

AA denotes acrylic acid (may be bio-renewable)

MAA denotes methacrylic acid (may be bio-renewable)

AIBN denotes azobisisobutyronitrile

DTPO denotes di-tertiairy butyl peroxide

PEG350 denotes the methoxy polyethylene glycol methacrylate available commercially from Cognis (part of BASF) under the trade mark Bisomer® mPEG350MA.

EXAMPLE I

To a round-bottomed flask equipped with a condenser, thermometer, and a stirrer are charged 43 parts of 2-butanone. The reactor contents are heated to 85° C. As soon as the polymerization temperature is reached, a monomer feed consisting of 25 parts of dimethyl itaconate (DMI), 20 parts of styrene (STY), 25 parts of methyl methacrylate (MMA), 30 parts of acrylic acid (AA), and 0.3 parts of azobisisobutyronitrile (AIBN) is fed to the reactor in a period of 270 minutes. At the end of the monomer feed the polymerization temperature is kept at 85° C. for another 60 minutes after which the reactor contents are cooled back to room temperature.

EXAMPLES II TO X

The Examples II to X are prepared analogously with reference to the method described in Example I above with reference to Table 1 below where the monomer feed in Example I is replaced with those ingredient and in the relative amounts listed in the Table 1.

TABLE 1

|     | II | III | IV | V | VI | VII | VIII | IX | X |
|-----|----|-----|----|----|----|-----|------|----|----|
| DMI | 25 | 62  | 55 | 43 | 61 | 55  | 55   | 55 | 55 |
| STY | —  | 5   | —  | —  | —  | 5   | —    | —  | —  |
| MMA | 25 | 3   | 15 | 32 | 9  | 15  | 15   | 20 | 15 |
| DEI | 25 | —   | —  | —  | —  | —   | —    | —  | —  |
| AA  | —  | 30  | —  | —  | 30 | —   | 30   | —  | 30 |
| iANH| 25 | —   | —  | 25 | —  | 25  | —    | 25 | —  |
| MAA | —  | —   | 30 | —  | —  | —   | —    | —  | —  |
| AIBN| 0.8| 0.2 | 0.6| 1.0| 0.2| 1.2 | 0.2  | 0.5| 0.2|

EXAMPLE XI

To a high pressure polymerization kid, equipped with a stirrer, thermometer, pressure release valve, and high pressure monomer dosage pump are charged 43 parts of 2-butanone. The reactor contents are heated to 140° C. As soon as the polymerization temperature is reached, a monomer feed consisting of 25 parts of dimethyl itaconate (DMI), 20 parts of styrene (STY), 25 parts of methyl methacrylate (MMA), 30 parts of acrylic acid (AA), and 0.15 parts of di-t-butyl peroxide (DTPO) is fed to the reactor in a period of 270 minutes. At the end of the monomer feed the polymerization temperature is kept at 85° C. for another 60 minutes after which the reactor contents are cooled back to room temperature.

EXAMPLES XII TO XX

The Examples XII to XX may be prepared analogously with reference to the method described in Example XI above with reference to Table 2 below where the monomer feed in Example XI is replaced with those ingredient and in the relative amounts listed in the Table 2.

TABLE 2

|      | XII | XIII | XIV | XV  | XVI | XVII | XVIII | XIX | XX  |
|------|-----|------|-----|-----|-----|------|-------|-----|-----|
| DMI  | 25  | 62   | 55  | 43  | 61  | 55   | 55    | 55  | 55  |
| STY  | —   | 5    | —   | —   | —   | 5    | —     | —   | —   |
| MMA  | 25  | 3    | 15  | 32  | 9   | 15   | 15    | 20  | 15  |
| DEI  | 25  | —    | —   | —   | —   | —    | —     | —   | —   |
| AA   | —   | 30   | —   | —   | 30  | —    | 30    | —   | 30  |
| iANH | 25  | —    | —   | 25  | —   | 25   | —     | 25  | —   |
| MAA  | —   | —    | 30  | —   | —   | —    | —     | —   | —   |
| DTPO | 0.2 | 0.4  | 0.1 | 0.5 | 0.1 | 0.1  | 0.5   | 0.1 | 0.1 |

EXAMPLE XXI

To a high pressure polymerization equipment, equipped with a stirrer, thermometer, pressure release valve, and high pressure monomer dosage pump are charged 34 parts of 2-butanone and 9 parts of 2-ethylhexyl alcohol. The reactor contents are heated to 140° C. As soon as the polymerization temperature is reached, a monomer feed consisting of 25 parts of dimethyl itaconate (DMI), 20 parts of styrene (STY), 25 parts of methyl methacrylate (MMA), 30 parts of acrylic acid (AA), and 0.15 parts of di-t-butyl peroxide (DTPO) is fed to the reactor in a period of 270 minutes. At the end of the monomer feed the polymerization temperature is kept at 85° C. for another 60 minutes after which the reactor contents are cooled back to room temperature.

EXAMPLES XXII TO XXX

The Examples XXII to XXX may be prepared analogously with reference to the method described in Example XXII above with reference to Table 3 below where the monomer feed in Example XXX is replaced with those ingredient and in the relative amounts listed in the Table 3.

TABLE 3

|      | XXII | XXIII | XXIV | XXV | XXVI | XXVII | XXVIII | XXIX | XXX |
|------|------|-------|------|-----|------|-------|--------|------|-----|
| DMI  | 25   | 62    | 55   | 43  | 61   | 55    | 55     | 55   | 55  |
| STY  | —    | 5     | —    | —   | —    | 5     | —      | —    | —   |
| MMA  | 25   | 3     | 15   | 32  | 9    | 15    | 15     | 20   | 15  |
| DEI  | 25   | —     | —    | —   | —    | —     | —      | —    | —   |
| AA   | —    | 30    | —    | —   | 30   | —     | 30     | —    | 30  |
| iANH | 25   | —     | —    | 25  | —    | 25    | —      | 25   | —   |
| MAA  | —    | —     | 30   | —   | —    | —     | —      | —    | —   |
| DTPO | 0.2  | 0.4   | 0.1  | 0.5 | 0.1  | 0.1   | 0.5    | 0.1  | 0.1 |

EXAMPLES XXXI TO XXXVI

The Examples XXXI to XXXVI may be prepared analogously with reference to the methods described herein above with reference to Table 4 below where the monomer feed may consists of the ingredients and the relative amounts listed in Table 4.

TABLE 4

|        | XXXI | XXXII | XXXIII | XXXIV | XXXV  | XXXVI |
|--------|------|-------|--------|-------|-------|-------|
| DMI    | 55   | 55    | 55     | 30    | 30    | 30    |
| DBI    | —    | —     | 20     | —     | —     | —     |
| MMA    | —    | —     | —      | 60    | 60    | 60    |
| AA     | 15   | 15    | 15     | 10    | —     | —     |
| DAAM   | 10   | 10    | 10     | —     | —     | —     |
| BA     | —    | 20    | —      | —     | —     | —     |
| IA     | —    | —     | —      | —     | 10    | —     |
| IANH   | —    | —     | —      | —     | —     | 10    |
| PEG350 | 20   | —     | —      | —     | —     | —     |
| Tg (° C.) | 37.2 | 49.4 | 74.0  | 101.8 | 105.9 | 104.1 |

EXAMPLES XXXVII TO XLIV

The following Examples XXXVII to XLIV were prepared as described below and some of their properties results are given in Table 5.

EXAMPLE XXXVII MMA/DMI/AA

To a round-bottomed flask equipped with a condenser, thermometer, and a stirrer are charged 394.0 parts of 2-butanone. The reactor contents are heated to 80° C. As soon as the polymerization temperature is reached, 13.3 parts of azobis(2-methyl butyronitrile) are added and the monomer feed and catalyst feed are started. The monomer feed consists of 244.4 parts of methyl methacrylate, 244.4 parts of dimethyl itaconate, and 244.4 parts of acrylic acid. The catalyst feed consists of 31.1 parts of azobis(2-methyl butyronitrile) dissolved in 125.9 parts of 2-butanone. Both feeds are added over a period of 180 minutes.

At the end of the feeds 2.5 parts of azobis(2-methyl butyronitrile) are added and the mixture is stirred at 80° C. for another 150 minutes. The mixture is cooled to room temperature.

To 615.8 parts of the polymer solution is added a mixture of 99.6 parts of a 25 wt-% of ammonia in water, and 1080.5 parts of water. Next, the 2-butanone is removed at 50° C. under reduced pressure. The solids content is corrected to 22.5% using demineralized water and the pH is corrected to 8.6-8.8 using a 25 wt-% solution of ammonia in water.

The final polymer solution has a solids content of 22.5% and a pH of 8.7.

EXAMPLE XXXVII S/DMI/AA

To a round-bottomed flask equipped with a condenser, thermometer, and a stirrer are charged 394.0 parts of 2-butanone. The reactor contents are heated to 80° C. As soon as the polymerization temperature is reached, 13.3 parts of azobis(2-methyl butyronitrile) are added and the monomer feed and catalyst feed are started. The monomer feed consists of 244.4 parts of styrene, 244.4 parts of dimethyl itaconate, and 244.4 parts of acrylic acid. The catalyst feed consists of 31.1 parts of azobis(2-methyl butyronitrile) dissolved in 125.9 parts of 2-butanone. Both feeds are added over a period of 180 minutes.

At the end of the feeds 2.5 parts of azobis(2-methyl butyronitrile) are added and the mixture is stirred at 80° C. for another 150 minutes. The mixture is cooled to room temperature.

To 546.1 parts of polymer solution is added a mixture of 105.4 parts of a 25 wt-% of ammonia in water, and 1144.1 parts of water. Next, the 2-butanone is removed at 50° C. under reduced pressure. The solids content is corrected to 22.5% using demineralized water and the pH is corrected to 8.6-8.8 using a 25 wt-% solution of ammonia in water.

The final polymer solution has a solids content of 22.4% and a pH of 8.6.

EXAMPLE XXXIX MMA/DMI/AA

To a high pressure reactor equipped with a thermometer, and a stirrer are charged 500.0 parts of 2-butanone. The reactor contents are heated to 140° C. As soon as the polymerization temperature is reached, 2.9 parts of di-t-butyl peroxide and 40 parts of 2-butanone are added. 5 minutes later the monomer feed is started. The monomer feed consists of 331.8 parts of methyl methacrylate, 331.8 parts of dimethyl itaconate, 331.8 parts of acrylic acid, 5.7 parts of di-t-butyl peroxide, and 6.6 parts of t-butyl perbenzoate, and is added over a period of 180 minutes at 140° C.

At the end of the feed the feed tank is rinsed with 90.9 parts of 2-butanone. 45 minutes after completion of the monomer feed 2.5 parts of t-butyl perbenzoate dissolved in 40 parts of 2-butanone are added and the mixture is stirred at 140° C. for another 45 minutes. Next, 2.5 parts of t-butyl perbenzoate dissolved in 40 parts of 2-butanone are added and the mixture is stirred for another 135 minutes at 140° C.

The mixture is cooled to room temperature.

To 619.3 parts of the polymer solution is added a mixture of 99.3 parts of a 25 wt-% of ammonia in water, and 1077.3 parts of water. Next, the 2-butanone is removed at 50° C. under reduced pressure. The solids content is corrected to 22.5% using demineralized water and the pH is corrected to 8.6-8.8 using a 25 wt-% solution of ammonia in water.

The final polymer solution has a solids content of 22.5% and a pH of 8.6.

EXAMPLE XL S/DMI/AA

To a high pressure reactor equipped with a thermometer, and a stirrer are charged 500.0 parts of 2-butanone. The reactor contents are heated to 140° C. As soon as the polymerization temperature is reached, 4.4 parts of di-t-butyl peroxide and 40 parts of 2-butanone are added. 5 minutes later the monomer feed is started. The monomer feed consists of 331.8 parts of styrene, 331.8 parts of dimethyl itaconate, 331.8 parts of acrylic acid, 8.6 parts of di-t-butyl peroxide, and 10.0 parts of t-butyl perbenzoate, and is added over a period of 180 minutes at 140° C.

At the end of the feed the feed tank is rinsed with 90.9 parts of 2-butanone. 45 minutes after completion of the monomer feed 2.5 parts of t-butyl perbenzoate dissolved in 40 parts of 2-butanone are added and the mixture is stirred at 140° C. for another 45 minutes. Next, 2.5 parts of t-butyl perbenzoate dissolved in 40 parts of 2-butanone are added and the mixture is stirred for another 135 minutes at 140° C. The mixture is cooled to room temperature.

To 617.8 parts of the polymer solution is added a mixture of 99.4 parts of a 25 wt-% of ammonia in water, and 1078.6 parts of water. Next, the 2-butanone is removed at 50° C. under reduced pressure. The solids content is corrected to 22.5% using demineralized water and the pH is corrected to 8.6-8.8 using a 25 wt-% solution of ammonia in water.

The final polymer solution has a solids content of 22.5% and a pH of 8.7.

EXAMPLE XLI SEQUENTIAL POLYMERIZATION USING THE POLYMER FROM EXAMPLE XXXVII

To a round-bottomed flask equipped with a condenser, thermometer, and a stirrer are charged 128.9 parts of the alkaline solution obtained from Example XXXVII. The mixture is heated to 80° C.±2° C.

As soon as the reaction temperature is reached, a mixture of 0.2 parts of sodium persulphate and 0.4 parts of demineralized water is added. After 5 minutes, the monomer feed, consisting of 43.8 parts of methyl methacrylate and 43.8 parts of butyl acrylate, and the initiator feed, consisting of 10.8 parts of demineralized water and 0.4 parts of sodium persulphate (corrected to a pH of 8 using a 25 wt-% ammonia solution) are started. Both feeds should take 120 minutes. At the end of the monomer feed, the feed tank is rinsed with 1.2 parts of water. After both feeds are completed, the batch is stirred at 80° C. for another 30 minutes, after which it is cooled to 50° C.

At 50° C., one third of a mixture consisting of 0.1 part of a 70 wt-% solution of t-butyl hydroperoxide is added followed by one third of a solution of 0.1 part of iso-ascorbic acid in 2.9 parts of water. 15 minutes later and 30 minutes later similar portions are added and the batch is stirred at 50° C. for another 15 minutes.

The pH is checked and, if necessary, adjusted to 8.4±0.1 using a 25 wt-% solution of ammonia in water. The batch is cooled to room temperature, after which the solids content is adjusted to 48.5%±1% using demineralized water.

EXAMPLE XLII SEQUENTIAL POLYMERIZATION USING THE POLYMER FROM EXAMPLE XXXVIII

A polymer was prepared analogous to the method described in Example XLI, using the alkaline solution obtained from Example XXXVIII. The final emulsion was highly viscous, requiring a dilution to a solids content of 35%.

EXAMPLE XLIII SEQUENTIAL POLYMERIZATION USING THE POLYMER FROM EXAMPLE XXXIX

A polymer was prepared analogous to the method described in Example XLI, using the alkaline solution obtained from Example XXXIX.

EXAMPLE XLIV SEQUENTIAL POLYMERIZATION USING THE POLYMER FROM EXAMPLE XL

A polymer was prepared analogous to the method described in Example XLI, using the alkaline solution obtained from Example XL.

TABLE 5

| | Results | | |
|---|---|---|---|
| | SC (%) | Viscosity (mPa · s) | pH |
| Example XLI | 47.6 | 208 | 8.4 |
| Example XLII | 34.8 | 1006 | 8.4 |
| Example XLIII | 48.1 | 35 | 8.5 |
| Example XLIV | 48.1 | 201 | 8.4 |

The invention claimed is:

1. A process for preparing a copolymer having a low molecular weight and high glass transition temperature, wherein the process comprises conducting a solution polymerisation process of a monomer composition comprising:
   (a) from 20 to 80 wt-% of at least one itaconate functional monomer not containing acidic groups or precursor acid groups,
   (b) not more than 40 wt-% of an acid functional monomer in an amount sufficient to achieve an acid value from 160 to 325 mg KOH per g of solid copolymer, and
   (c) optionally not more than 72 wt. % of monomers other than monomers (a) or (b); wherein
   the weight percentages of monomers (a), (b) and (c) total 100% and are calculated as a proportion of the total amount of monomers in the copolymer being 100%;
   and with the provisos:
   (I) the copolymer has a number average molecular weight (Mn) of no more than 15 kilograms per mole; and
   (II) the copolymer has a glass transition temperature of at least 75° C., and
   (III) the copolymer contains less than 40 wt-% vinyl aromatic monomer; and optionally
   (IV) the copolymer contains less than 40 wt-% methacrylate monomer.

2. The process as claimed in claim 1, wherein monomer (a) comprises a compound of Formula 1:

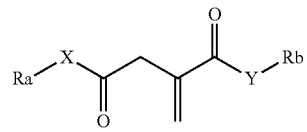

(1)

where Ra and Rb independently represent any optionally substituted hydrocarbo moiety; and
X and Y independently represent —O— and/or —NRc-, where Rc independently in each case represents H and/or any optionally substituted hydrocarbo moiety;
with the proviso that Formula 1 does not contain:
any acidic group, or
any precursor acid group which readily generates an acid group under polymerisation process conditions.

3. The process as claimed in claim 1, wherein monomer (b) is an acid functional monomer or precursor thereof selected form at least one ethylenically unsaturated carboxylic acid and/or derivatives thereof.

4. The process as claimed in claim 3, wherein the monomer composition is substantially free of arylalkylene and/or vinyl aromatic monomers.

5. The process as claimed in claim 1, wherein the copolymer is a solid grade oligomer (SGO).

6. The process as claimed in claim 1, wherein the solution polymerization process comprises the steps of:
   (i) polymerising monomers (a), (b) and (c) under solution polymerisation process conditions in the presence of solvent, and
   (ii) removing substantially all the solvent from step (i) to thereby obtain a copolymer comprising at least 95% solids.

* * * * *